US 7,152,034 B1

United States Patent
Layng et al.

(10) Patent No.: US 7,152,034 B1
(45) Date of Patent: *Dec. 19, 2006

(54) TEACHING METHOD AND SYSTEM

(75) Inventors: Terrence V. Layng, Seattle, WA (US);
Kent R. Johnson, Seattle, WA (US);
Janet S. Iwyman, Rego Park, NY
(US); Victoria Ford, Seattle, WA (US);
Michael P. Layng, Seattle, WA (US);
Marilyn R. Gilbert, Bainbridge Island,
WA (US); Gregory Stikeleather, Palo
Alto, CA (US)

(73) Assignee: Headsprout, Inc., Seattle, WA (US)

( * ) Notice: Subject to any disclaimer, the term of this patent is extended or adjusted under 35 U.S.C. 154(b) by 515 days.

This patent is subject to a terminal disclaimer.

(21) Appl. No.: 10/323,964

(22) Filed: Dec. 18, 2002

Related U.S. Application Data

(63) Continuation of application No. 09/775,352, filed on Jan. 31, 2001, now Pat. No. 6,523,007.

(51) Int. Cl.
*G09B 17/00* (2006.01)
*G09B 19/04* (2006.01)

(52) U.S. Cl. ..................... 704/270; 434/178; 434/185

(58) Field of Classification Search ................ 704/231, 704/251, 270, 271, 275, 276; 434/185, 156, 434/178, 353, 362
See application file for complete search history.

(56) References Cited

U.S. PATENT DOCUMENTS

| | | | |
|---|---|---|---|
| 5,303,327 A | 4/1994 | Sturner et al. | |
| 5,336,093 A | 8/1994 | Cox | |
| 5,634,086 A * | 5/1997 | Rtischev et al. | 704/270 |
| 5,779,486 A * | 7/1998 | Ho et al. | 434/353 |
| 5,885,083 A * | 3/1999 | Ferrell | 434/156 |
| 6,017,219 A | 1/2000 | Adams, Jr. et al. | |
| 6,022,222 A | 2/2000 | Guinan | |
| 6,077,085 A | 6/2000 | Parry et al. | |
| 6,120,298 A | 9/2000 | Jenkins et al. | |
| 6,146,147 A | 11/2000 | Wasowicz | |
| 6,206,700 B1 * | 3/2001 | Brown et al. | 434/116 |
| 6,299,452 B1 * | 10/2001 | Wasowicz et al. | 434/178 |
| RE37,684 E | 4/2002 | Shpiro et al. | |
| 6,652,283 B1 * | 11/2003 | Van Schaack et al. | 434/236 |
| 6,711,544 B1 * | 3/2004 | Spiser-Albert et al. | 704/271 |
| 6,732,076 B1 * | 5/2004 | Masterson et al. | 704/254 |
| 6,751,440 B1 * | 6/2004 | Sugimoto | 434/362 |

OTHER PUBLICATIONS

Alessi, G., "Generative strategies and teaching for generalization", The Analysis of Verbal Behavior, 1987, pp. 15-27, vol. 5.

(Continued)

*Primary Examiner*—Martin Lerner
(74) *Attorney, Agent, or Firm*—Fenwick & West LLP

(57) ABSTRACT

A method and system provides procedures/routines to teach certain repertoires, such as reading, to learners without a teacher present. The various routines can be provided or implemented via a computer network, such as the Internet, so that multiple learners can access and use the routines. Feedback features take into account that the Internet is a medium where it is difficult to directly monitor the learner's activities during the course of various lessons provided by the routines. The routines may be implemented in a sequence of episodes, with each episode systematically building on the particular skills learned in a prior episode. Some of these routines include establishing routines, adduction routines, potentiating routines, composite routines, sequential composite routines, fluency routines, motivation routines, application routines, and the overall sequencing of these routines.

14 Claims, 34 Drawing Sheets

OTHER PUBLICATIONS

Andronis, P. T., et al., "Contingency adduction of 'symbolic aggression' by pigeons", The Analysis of Verbal Behavior, 1997, pp. 5-17, vol. 14.

Binder, C., "Behavioral Fluency: Evolution of a new paradigm", The Behavior Analyst, 1996, pp. 163-197, vol. 19.

Dempster, F. N., "The spacing effect: A case in the failure to apply the results of psychological research", American Psychologist, 1988, pp. 627-624, vol. 43.

Engelmann, S., et al., "Decoding strategies", 1978, Science Research Associates, Chicago, pp. 2-8.

Engelmann, S., et al., "Teach your child to read in 100 easy lessons", 1983, pp. 7-34, Simon & Schuster, N.Y.

Epstein, R., "Cognition, Creativity, and Behavior: Selected Essays", 1996, pp. 13-35, Praeger Publishers, Westport, CT.

Ericsson, K. A., et al., "The role of deliberate practice in the acquisition of expert performance", Psychological Review, 1993, pp. 363-406, vol. 100.

Ferster, C. B., "The use of the free operant in the analysis of behavior", Psychological Bulletin, 1953, pp. 263-274, vol. 50.

Gilbert, T. F., "Mathetics: The technology of education", The Journal of Mathetics, 1962, pp. 7-73, vol. 1.

Goldiamond, I., "Machine definition of ongoing silent and oral reading rate", Journal of the Experimental Analysis of Behavior, 1962, pp. 363-367, vol. 5.

Goldiamond, I. et al., "Reading as operant behavior", The Disabled Reader: Education of the Dyslexic Child, 1966, pp. 93-115, Johns Hopkins Press, Baltimore, MD.

Haughton, E.C., "Aims: Growing and sharing", Let's try doing something else kind of thing, 1972, pp. 20-39, Council on Exceptional Children, Arlington, VA.

Haughton, E.C., "Practicing practices: Learning by activity", Journal of Precision Teaching, 1980, pp. 3-20, No. 1.

Holland, J.G. et al., "The analysis of behavior in planning instruction", Units 9 and 16, Addison-Wesley Publishing Company, 1976.

Johnson, K. R., et al., "Breaking the structuralist barrier: Literacy and numeracy with fluency", American Psychologist, 1992, pp. 1475-1490, No. 47.

Johnson, K. R., et al., "The Morningside Model of Generative Instruction", Behavior analysis in education: Focus on measurably superior instruction, 1994, pp. 173-197, Brooks-Cole Publishing Company, Belmont, California.

Johnson, K. R., et al., "On terms and procedures: Fluency", The Behavior Analyst, 1996, pp. 281-288, No. 19.

Kinder, D., et al., "Direct instruction: What it is and what it is becoming", Journal of Behavioral Education, 1991, pp. 193-214, No. 1.

Laberge, D., et al., "Toward a theory of automatic information processing in reading", Cognitive Psychology, 1974, pp. 293-323, No. 6.

Layng, T. V. J., "Causation and complexity: Old lessons, new crusades", Journal of Behavior Therapy & Experimental Psychiatry, 1995, pp. 249-258, No. 26.

Layng, T. V. J., "A selectionist approach to verbal behavior: Sources of variation", Dialogues on veral behavior, 1991, pp. 146-150, Context Press, Reno, Nevada.

Lindsley, O. R., "Precision teaching: By teachers for children", Teaching Exceptional Children, 1990, pp. 10-15, No. 22.

Markle, S. M., "Designs for instructional designers", 3rd Edition, 1990, pp. 1-207, Stipes Publishing Company, Champaign, IL.

Ray, B. A., "Selective attention: The effects of combining stimuli which control incompatible behavior", Journal of the Experimental Analysis of Behavior, 1969, pp. 539-550, No. 13.

Schiller, P. H., "Innate motor action as a basis of learning", Instinctive behavior: The Development of Modern Concept, 1957, pp. 264-287, International Universities Press, Inc., New York.

Skinner, B.F., Verbal behavior, Chapters 2 (pp. 13-34), 4 (pp. 52-80), and 11 (pp. 293-309), 1957, Prentice-Hall, Inc., Englewood Cliffs, NJ.

Tenenbaum, H. et al., "Effects of oral reading rate and inflection on intraverbal responding", The Analysis of Verbal Behavior, 1989, pp. 83-89, No. 7.

Terrance, H.S., "Errorless Transfer of a Discrimination Across Two Continua", Journal of the Experimental Analysis of Behavior, 1963, pp. 6 and 223-232.

Tiemann, P.W. et al., "Analyzing instructional content: A guide to instruction and evaluation", 4th Edition, pp. 1-281, Stipes Publishing Company, Champaign, IL.

Vanasse, S. et al., "Flexgames: Flexible game formats for improving learning and performance", International Society for Performance Improvement (ISPI), vol. 37, No. 2.

* cited by examiner

TEACHING METHOD AND SYSTEM

CROSS-REFERENCE TO RELATED APPLICATION

This application is a continuation of U.S. patent application Ser. No. 09/775,352 filed on Jan. 31, 2001, now issued as U.S. Pat. No. 6,523,007, entitled "Teaching Method and System," on Feb. 18, 2003.

BACKGROUND OF THE INVENTION

1. Field of the Invention

The present invention relates generally to educational techniques, and in particular but not exclusively, relates to computer-assisted teaching methods and systems that teach repertoires based upon psychomotor, simple, and complex cognitive learning (hereafter referred to as "skills"), such as reading, to children, youth, and adults.

2. Background Information

Reading, math, and reasoning are among the fundamental skills required in the information age. For example, to navigate the digital world, one must be able to read, and those who do not read well risk not benefiting or advancing in society. Therefore, providing high-quality instruction to all children is a priority, but is often difficult or time-consuming to accomplish practically and efficiently.

Again, using reading as an example, traditional classroom instruction, under the direction of an instructor, typically takes weeks and months to teach children how to read. These traditional methods require the teacher to interact extensively with the child, in order to give the child feedback on what to read, to indicate whether words are being spoken correctly or incorrectly, to keep the child motivated to keep reading, etc. Thus, it is the teacher, rather than the child, who does the listening, evaluating, and correcting. These are among the many reasons why traditional teaching methods are inefficient, time-consuming, and cumbersome.

Other reasons why these traditional teaching methods are not fully effective for individuals (both children and adults) include problems due to retention and problems due to movement of the instruction to later subject matter before the individual has fully mastered previous subject matter. Most individuals learn at different paces, but classroom instructions are typically conducted at a single pace. The relation between the responses that a learner makes during learning and the feedback that the learner receives is very inexact in group instruction. Children who are slower learners must keep up with the group or risk falling behind in the learning process. Conversely, children who learn faster than the pace of the classroom instruction risk getting bored or disinterested.

Some "on-line" courses or instructional modules (e.g., videotapes, audio tapes, software packages, etc.) are available outside of a traditional classroom setting to teach individuals certain subjects. These non-traditional techniques are typically used to supplement traditional classroom instruction and/or to provide instruction where traditional classroom instruction may not otherwise be available or practical.

However, many of these courses or modules assume certain fundamental learning skills, such as reading, and involve an instructor who reviews assignments and gives feedback. In some cases, feedback is not even available. This is not a practical solution where there are millions of learners. Furthermore, many of these courses or modules have a cumbersome interface, require computer disks or special equipment, all of which can be unsuitable or difficult to use with young children. Because of these limitations, it has been debated whether such non-traditional teaching methods actually teach fundamental skills more efficiently or effectively than (or at the same level as) a traditional classroom.

Another problem with both traditional classroom instruction and on-line courses is the lack of practice opportunities to master a given repertoire. This is due in part because traditional classroom instruction and on-line courses are tailored towards a group or towards a uniform teaching style, rather than being tailored and specific to the needs and progress of a particular individual. It simply is not efficient or cost effective for these teaching methods to deviate from the norm/pace and provide practice opportunities that are specifically suited for a particular individual; an on-line course module is mass-produced for a general population and would be too expensive to manufacture to include individually customized practice routines; and traditional classroom instruction does not have the time during a school year to provide sufficient customized in-class practice for each individual and instead depends on the individual to practice, if at all, via "homework."

Accordingly, improvements are needed in teaching techniques.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Figure 1:
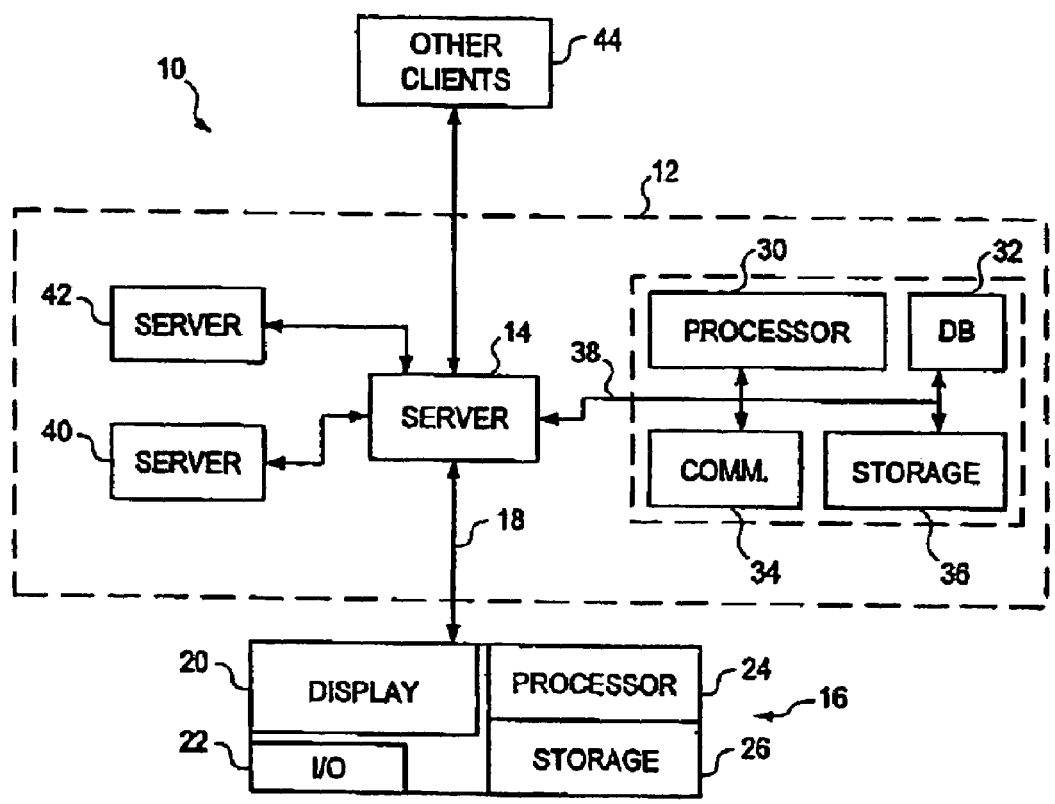
FIG. 1 is a block diagram of an example system that can implement an embodiment of the invention.

Embodiments of a method and system to teach certain skills, such as reading, to people of all ages are described herein. In the following description, some specific details are provided so as to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention include procedures/routines to teach certain repertoires to learners without a teacher present. In accordance with one embodiment of the invention, the various procedures/routines can be provided or implemented via a computer network, such as the Internet, so that multiple learners can access and use the repertoires. Additionally, embodiments of the invention include certain features that take into account that the Internet is a medium where it is difficult, if not impossible, to directly monitor the learner's activities during the course of the various lessons.

An aspect of the invention provides a system to teach a repertoire. The system includes an establishing module having a routine to teach identification of a component to a user, and discrimination of the component from other components. A composite module has a routine to teach identification of the component embedded in other components, and how they work in combination, to the user. An adduction module has a routine to recruit elements of previously learned skills into new skill sets, obviating the need to build these new elements independently. The system also includes a fluency module having a routine to provide the user sufficient practice to retain results acquired from the establishing, composite, and adduction modules. The modules are capable of being provided to the user via the Internet.

For illustrative purposes and for simplicity of explanation, embodiments of the invention as they may be applied to teach the skill of reading will be described herein, and it is understood that the principles of these embodiments can be extended and applied to teach other types of skills. Furthermore, embodiments are described herein in the context of teaching the skills to children, such as those between 4 and 6 years of age. It is to be appreciated that the teaching procedures of the various embodiments can be applied to or modified to teach the skills to children of other ages, adolescents/youth, and adults. Therefore, the invention is not necessarily limited based on the age of the individual.

Various embodiments of routines of the teaching method are illustrated by way of flowchart in the figures. For simplicity of explanation, only parts of the flowcharts that are of particular interest will be explained in detail below. Further details of operation of the routine/algorithm of the flowcharts (or details of some of the illustrated components of the flowcharts) will be familiar to those skilled in the art based on what is shown in the flowcharts and based on the description provided herein, and so are not described in great detail below for the sake of brevity. Also for simplicity of explanation, initial episodes and routines/flowcharts are described in detail to help obtain an initial understanding of an embodiment of the invention. Subsequently, episodes and routines/flowcharts may be described in less detail because they build upon prior explanations.

Furthermore, for illustrative purposes and for simplicity of explanation, some embodiments are described herein in the context of "displaying" certain elements to the user. It is to be appreciated that the invention is not necessarily limited to "displaying" and other embodiments can include implementations where such elements are presented using other techniques, such as audio, audiovisual, kinesthetic, or other types of presentation.

Referring first to FIG. 1, shown generally at 10 is an example of a system that can implement an embodiment of the invention. The system 10 can include a network 12, such as the Internet, but other types of communication networks may be utilized as well. For example, the network 12 can comprise a local area network (LAN), virtual local area network (VLAN), asynchronous transfer mode (ATM) network, or other network or portion of a network.

The system 10 includes one or more servers 14 communicatively coupled to one or more terminals 16 via one or more links 18. The server 14 can run web server software to provide a web site having hypertext markup language (HTML), extensible markup language (XML), extensible style language (XSL), etc. web pages to the terminals 16, using a protocol such as hypertext transfer protocol (HTTP), file transfer protocol (FTP), or other suitable protocol. In one embodiment, the server 14 can provide web pages to the teal 16 having various screen displays, icons, text, graphics, etc. to assist in teaching a user of the terminal 16 (e.g., a "learner" such as a child) how to read, or engage in another fundamental intellectual skill.

The terminals 16 can comprise personal computers (PCs) to access the server 14. The terminals 16 each have a display screen 20 that allows users to view information sent to and from the server 14, using a suitable commercially available web browser such as Microsoft's Internet Explorer™ or Netscape's Navigator™. The terminal 16 can include an input/output unit 22, such as a keyboard and mouse. The input/output unit 22 may also include or be coupled to an audio device, such as a speaker, to allow audible feedback to be provided to the user during the course of teaching. The terminal 16 may also include a processor 24, and a storage unit 26, which can be any type of machine-readable storage medium such as read only memory (ROM), random access memory (RAM), compact disks (CDs), digital versatile disks (DVDs), hard disk, magnetic tape, floppy disks, caches, etc.

The server 14 can include one or more processor units 30 to perform the various methods, processes, algorithms, etc. described herein. The processor unit 30 can be communicatively coupled to one or more database units 32 or other machine-readable medium, in a manner such that information in the database unit 32 is accessible by the processor unit 30. The server 14 can also include other storage unit(s) 36 to provide the server 14 with additional storage capacity. According to an embodiment of the invention, the storage unit 36 and/or the database unit 32 may store files, algorithm software, user data collected during the course of a lesson, or other machine-readable instructions usable for the various embodiments described herein. The server 14 may further include a communication unit 34 to provide communication hardware, software, protocols, and other features and functions for communication between the server 14 and the terminal 16 (or between the server 14 and other units connected to the network 12).

The units 30–36 can be communicatively coupled to each other, as shown symbolically by a link 38, thereby allowing communication/linking and data exchange between these units. One or more of the units 30–36 can be located on the server 14 or they can be located elsewhere in the network 12.

Further, while only one processor unit 30, database unit 32, and storage unit 36 are shown in FIG. 1, it is understood that there can be any number of these units. Also, it is possible to combine one or more of these units into a single unit. The storage unit 36 and database unit 32 can comprise any type of suitable machine-readable storage media (e.g., ROM, RAM, CDs, DVDs, magnetic tape, floppy disks, etc.) having database hardware configurations and associated data structures, or they can comprise, more or less, machine-readable storage media that can store and organize information other than in a "database-type" format. Accordingly, embodiments of the invention are not limited by the specific number, types, or arrangement of the units 30–36.

The system 10 can include additional servers 40–42 coupled to the server 14. The server 14 can be further communicatively connected to other terminals (e.g., clients) 44, thereby allowing an embodiment of the teaching method to be provided to the other terminals 44 or to the other servers 40–42, in a manner such that the teaching method can be accessed and used by multiple users.

In accordance with an embodiment of the invention, a plurality of episodes in a sequence are stored in the server 14 and provided to the terminal 16. The episodes can be presented to a child via the display screen 20, in the form of graphics, cartoons, animation, or other type of visual element that is suitable for a child. Streaming technology can be used in one embodiment to provide the visual elements. Accompanying audio, in the form of .wav files in an embodiment, can be played on the input/output unit 22 to provide the child with audible prompts, feedback, etc. with regards to interaction with the episodes. The input/output unit 22, if in the form of a mouse, can also allow the child to "click" on various visual elements of the episodes during the course of the teaching lesson(s).

Outlined below is an example of an episode sequence to teach reading. For the sake of simplicity of explanation, the embodiment shown in the outline shows 25 episodes, and it is understood that any suitable number of episodes can be included in an episode sequence according to various embodiments. The episodes together can form one or more stories or animated presentations (e.g., "space world" or "dino world"). Each of the outlined episodes is broken down and identified into numbered parts (e.g., 1, 2, 3, . . . ), with each part teaching a particular sound (e.g., a "component"), a combination of components (e.g., a "composite"), sentence(s), or other skill elements. Where appropriate for each episode part, various skills or strategies are identified by segment letters (e.g., A, B, D, etc.), which can be embodied in algorithms/routines (or subroutines) that will be explained in further detail below. The various lettered routines in the episodes (as well as the episodes themselves) are sequenced, mixed, and/or interlocked to systematically achieve different levels of learning and progress. The routines and episodes may be embodied in software, modules, or other machine-readable instruction stored in a storage unit of the server 14. Examples of these routines referenced by the letters include, but are not limited to, establishing routines, adduction routines, potentiating routines, composite routines such as blending and segmenting routines, sequential composite routines such as sentence and story routines, fluency routines, motivation routines, application routines, and the overall sequencing of these routines, which are illustrated in one embodiment by the following episode sequence:

Episode 1: space world
1. s (skills: A, B)
1. s (skill: D)
2. ee (skills: A, B)
3. s, ee (skill: F)
4. ee (skill: P)

Episode 2 space world
1. v (skills: A, B)
1. v (skill: D)
2. an (skills: A, B)
2. an (skill: D)
3. v, an (skill: F)
4. n(an) (skill: E)
5. an, n (skill: F)
6. s, ee, v, an, n (skill: G)

Episode 3 space world
1. s, ee (strategy: Je)
2. vee, van, see, san (strategy: Ka)
3. see (strategy: Pm)
3. (4.) san (strategy: P)
3. (5.) van (strategy: P)
3. (6.) vee (strategy: P)
7. v, an, n (strategy: Je)

Episode 4 space world
1. see (strategy: Ke)
2. san (strategy: Ke)
3. see, san (skill: $F_2$)
4. van (strategy: Ke)
5. vee (strategy: Ke)
6. van, vee (skill: $F_2$)
7. see, san, van, vee (skill: F)
8. word reading Episode 5 space world
1. the (skills: A, B)
1. the (skill: D)
2. see, van, vee, san, the (skill: G)
3. sentence sequencing
4. y/n sentence fluency
5. story reading Episode 6 dino world
1. cl (skills: A, B)
1. cl (skill: D)
2. cl, c, l (skill: E)
2. cl, c, l (skill: F)
2. cl, c, l (skill: G)

3. s, ee, an, c, cl, v, l, n, the (skill: H)
4. non-fluent elements (skill: G)

Episode 7 dino world
1. cl, c, l (strategy: Je)
2. can, lee, san, vee (strategy: Kf)
3. can (strategy: P)
4. lee (strategy: P)
4. Lee (Cap)
5. can (strategy: Ke)
6. Lee (strategy: Ke)
7. can, Lee (skill: $F_2$)
8. can, Lee, san, vee (skill: Hw)

Episode 8 dino world
1. fr (skills: A, B)
1. fr (skill: D)
2. fr, f, r (skill: E)
2. fr, f, r, (skill: F)
2. fr, f, r, (skill: G)
3. fl, cr, sl, sn (strategy: 1)
4. fl, cr, sl, sn (skill: G)

Episode 9 dino world
1. fl, cr, sl, sn, f, r, fr (strategy: Je)
2. feels (strategy: Ke)
3. fran (strategy: Ke)
4. Fran (skill: Cap)
5. feels, Fran (skill: $F_2$)
6. fan (strategy: Ke)
7. ran (strategy: Ke)
8. fan, ran (skill: $F_2$)
9. Fran, feels, ran, fan (skill: F)
10. Fran, feels, ran, fan (skill: Hw)

Episode 10 dino world
1. Fran, feels, the, fan (skill: G)
2. can, sees, flee, reel (skill: Hw)
3. Fran sees Lee . . . et al. (strategy: W)
4. story, words from Episodes 1–10 (strategy: Q)

Episode 11 dino world
1. non-fluent elements (skill:Gr)
2. and (skills: A, B)
3. l (skills: A, B)
4. and, l (skill: F)
5. out (skills: A, B)
6. and, l, out (skill: F)
6. and, l, out (skill: G)
7. Fran ran out . . . et al. (strategy: W)

Episode 12 sea world
1. ip (skills: A, B)
1. ip (skill: D)
2. p(ip) (skill: E)
3. ip, p (skill: F)
3. ip, p (skill: G)
4. pl, pr, sp (skill: 1)
4. pl, pr, sp (skill: G)

Episode 13 sea world
1. p, ip, pl, pr, sp (strategy: Je)
2. flips, sleeps, sand, pip (strategy: Kavw)
3. flips (strategy: Ke)
4. sand (strategy: Ke)
5. flips, sand (skill: $F_2$)
6. sleeps (strategy: Ke)
7. Pip (skill: Cap)
7. Pip (strategy: Ke)
8. sleeps, Pip (skill: $F_2$)
9. sleeps, Pip, flips, sand (skill: F)
9. sleeps, Pip, flips, sand (skill: Hw)

Episode 14 sea world
1. Clee, plan, reef, feel (strategy: Kavw)
2. Clee (strategy: Ke)
3. plan (strategy: Ke)
4. Clee (skill: Cap)
5. Clee, plan (skill: $F_2$)
6. reef (strategy: Ke)
7. feel (strategy: Ke)
8. reef, feel (skill: $F_2$)
9. Clee, plan, reef, feel (skill: F)
9. Clee, plan, reef, feel (skill: Hw)
9. Clee, plan, reef, feel (skill: G)

Episode 15 sea world
1. non-fluent elements (skill: G)
2. slips, land, peel, free (strategy: Ks)
3. slips, land, peel, free (skill: Hw)
4. Lee and Fran slip . . . et al. (strategy: W)
5. story, with words from Episodes 1–15 (strategy: Q)

Episode 16 sea world
1. ish (skills: A, B)
1. ish (skill: D)
2. sh(ish) (skill: E)
3. sh, ish (skill: F)
3. sh, ish (skill: G)

Episode 17 sea world
1. ish, sh (strategy: Je)
2. shouts, fish, sheep, ship (strategy: Kavws)
3. shouts (strategy: Ke)
4. fish (strategy: Ke)
5. shouts, fish (skill: $F_2$)
6. sheep (strategy: Ke)
7. ship (strategy: Ke)
8. sheep, plan (skill: $F_2$)
9. shouts, fish, sheep, ship (skill: F)
9. shouts, fish, sheep, ship (skill: Hw)

Episode 18 sea world
1. non-fluent elements (skill: G)
2. (skill: Hw)
3. Lee shouts . . . et al. (strategy: W)
4. story with words from Episodes 1–18 (strategy: Q)

Episode 19
1. old (skill: B).
2. is (skill: B)
3. old, is (skill: $F_2$)
4. h (skill: B)
4. h (skill: $F_2$)
5. old, is, h (skill: G)
6. old, h (strategy: Je)
6. old, h (strategy: Kf)
7. old, is, h (strategy: W=2 sentences)

Episode 20
1. w (skill: B)
2. sw (skill: E)
3. ing (skill: B)
4. w, sw, ing (skill: $F_2$)
4. w, sw, ing (skill: G)
5. w, sw, ing (strategy: Je)
5. w, sw, ing (strategy: Kf)
6. w, sw, ing (strategy: Q=3 sentences)

Episode 21
1. nonfluent elements (skill: G)
2. t (skill: B)
3. tr, st (skill: l)
4. t, tr, st (skill: $F_2$)
4. t, tr, st (skill: G)
5. t, tr, st (strategy: Je)
5. t, tr, st (strategy: Kf)
6. (strategy: W=2 sentences)

Episode 22
1. could (skill: B)
   2. would, should (skill: l)
3. could, would, should (skill: $F_2$)
3. could, would, should (skill: G)
4. (strategy: Q=5 sentences)

Episode 23
1. ike (skill: B)
2. ake (skill: E)
3. ike, ake (skill: $F_2$)
3. ike, ake (skill: G)
4. ike, ake (strategy: Je)
4. ike, ake (strategy: Kf)
5. (strategy: W=3 sentences)

Episode 24
1. nonfluent elements (skill: G)
2. b (skill: B)
3. bl, br (skill: l)
4. b, bl, br (skill: $F_2$)
4. b, bl, br (skill: G)
5. b, bl, br (strategy: Je)
5. b, bl, br (strategy: Kf)
6. (strategy: Q=3 sentences)

Episode 25
1. oa (skill: B)
2. er (skill: B)
3. oa, er (skill: $F_2$)
3. oa, er (skill: G)
4. oa, er (strategy: Je)
4. oa, er (strategy: Kf)
5. (strategy: W=4 sentences)

Beginning first with Episode 1, Parts 1–3 of Episode 1 teach a child to respectively identify the letters "s" and "ee" and their sounds. Part 1 of Episode 1 performs this by using a sequence of establishing routines A, B, D. Part 2 of Episode 1 uses the establishing routines A and B (but not D) for "ee," and Part 3 of Episode 1 uses for "ee" and "s" the establishing routine F. Part 4 of Episode 1 uses for "ee" and "s" the segmenting and blending routine P, and may use the establishing routine C in another embodiment (not shown). An embodiment of an establishing routine comprises features to rapidly teach a learner the initial phonetic and other sound/symbol "components" of reading, and which later can be used in more elaborated reading strategies or "composites."

An establishing routine establishes sound/symbol control over a young speaker's verbal behavior, and transfers that control to textual stimuli, which is the decoding basis of reading. One embodiment of the establishing routine accomplishes this by carefully sequencing specific component skills, which allow for a rapid acquisition of basic reading strategies.

Embodiments of the establishing routine are unique in the way visual and auditory stimuli are presented and sequenced, and in the way that learner behavior is confirmed or corrected. These establishing routines may also used to teach whole-word reading if or when necessary. Although an embodiment of the establishing routine is described herein for teaching reading skills, these establishing routines may be employed to teach any type of paired associate, multiple discrimination, or algorithmically based learning objective.

The four segments or types of establishing routines include pairing (A), simple discrimination (B), discrimination (D), and conditional discrimination (F). The establishing routine A involves visual and auditory pairing of each sound element. For example in Part 1, a child may first be visually presented with a graphic (such as a "spaceship") and the letter "s" on the display unit 20, accompanied by an auditory playing of its pronunciation (e.g., "The sound that this letter makes is ['s' sound]. Listen to it again. ['s' sound]."). Next, the letter "s" disappears from the display unit 20 and the child is asked to click on the spaceship, or other graphic, to hear and see the letter "s" and "the sound this letter makes" again. If the child clicks correctly, then the letter "s" is redisplayed and pronounced (accompanied by an auditory narration such as "This is the letter 's'.)" If the child clicks incorrectly, then the spaceship or other graphic may be displayed at different locations, in different formats, multiple times, etc., accompanied by an auditory narration such as "Click on the spaceship to see the letter and hear the sound the letter makes," until the child clicks correctly. This process may be repeated and the child's responses timed. Thus, the establishing routine A allows a child to be presented with auditory and visual presentations of an element, and then allows the child to pair/identify sound and/or appearance of the element by "clicking" on corresponding graphics. This routine may be used anytime one stimulus is paired with another. First the stimulus is paired in one direction (e.g., X then Y), then it is paired in the opposite direction (e.g., Y then X), with the learner prompted to make an observing response.

Continuing with Part 1 of Episode 1, after successful completion of the establishing routine A, the establishing routine B involves simple discrimination of the "s" sound's presence and absence. In an embodiment, the establishing routine B includes presenting the letter "s" (and playing the "s" sound that it makes) to the child and asking the child to click on the presented letter. A feedback sound (such as a "starburst" or other stimulus changes, followed by point-to-point letter-sound confirmation and/or verbal praise) is played if the child clicks correctly. The establishing routine B may then be repeated and the child's responses timed, with the letter "s" being displayed elsewhere and the child being prompted to click on the letter. Whenever the child clicks incorrectly, feedback in the form of repeated instruction, audio corrections, or audio and visual comparisons of correct and incorrect responses, etc. may be provided. This embodiment of the routine serves to establish control over the learner's direct response to a stimulus, and to ensure that the response is under instructional control. The feedback includes the production of the feature of the stimulus as well as the confirmation of correctness.

Continuing with Part 1 of Episode 1, after successful completion of the establishing routine B, the establishing routine D involves discrimination between the sound element and juxtapositions of other similar sounds. The establishing routine D may involve display or other presentation of the letter "s" with other letters in an array (or in a row thereof), and invites the child to select the letter "s" by clicking on it. A running total of "correct" clicks for the child may be kept until the child reaches a threshold of correct clicks. As before, timing and reward animation or feedback may be provided to the child, including feedback that something incorrect was clicked by the child (e.g., "That letter you clicked is not the letter 's'."). Thus, the establishing routine D allows a child to identify an individual element (and/or its sound) from other elements/sounds. This establishing routine can be used in situations when a multiple discrimination may be required. The "non examples" (the letters that are not "s" in this illustration) are topographically (either in their visual or acoustic properties) similar to the example stimuli (the letter "s" in this illustration). Both confirmatory, as in the establishing routine B above, and corrective feedback are provided, such as described for the establishing routine F below.

In Part 2 of Episode 1, after successful completion of the Part 1, the establishing routines A and B are provided for the element "ee," and in an embodiment, the establishing routine D is not provided for the element "ee" since the establishing routine F in Part 3 has some overlap with the establishing routine D.

The establishing routine F involves conditional discrimination of clicking responses to indicate different sounds present, such as when both "ee" and "s" are displayed to the child. That is, an embodiment provides a stimulus, such as an array (or row thereof) to the child, with each array having the element(s) "s," "ee," or both, and several other elements that are unfamiliar to the child. An audible prompt instructs the child to select/click the element "s" or "ee" as each row is displayed, and the number of correct clicks is tracked until the child reaches a threshold number of correct clicks. By presenting the establishing routine F with an array having both the elements "s" or "ee," which are now familiar to the child given the successful completion of Parts 1–2, it is possible in an embodiment to make "s" the "correct answer" (an "example" sometimes denoted in the figures as "eg") in a row having an "ee," or vice versa. Furthermore, what was correct in a previous row can be made incorrect (a "nonexample" denoted as "neg"). As an illustration, a first row having the element "ee" can prompt the child to click on the element "s." If the child successfully clicks the "s" in the first row, a second row can be displayed having an "s" element and an "ee" element, but the prompt will now ask the child to click on the "ee" element, which was previously an incorrect nonexample in the first row. In this manner, the child is further taught how to visually and audibly differentiate known elements from each other.

Figure 2:
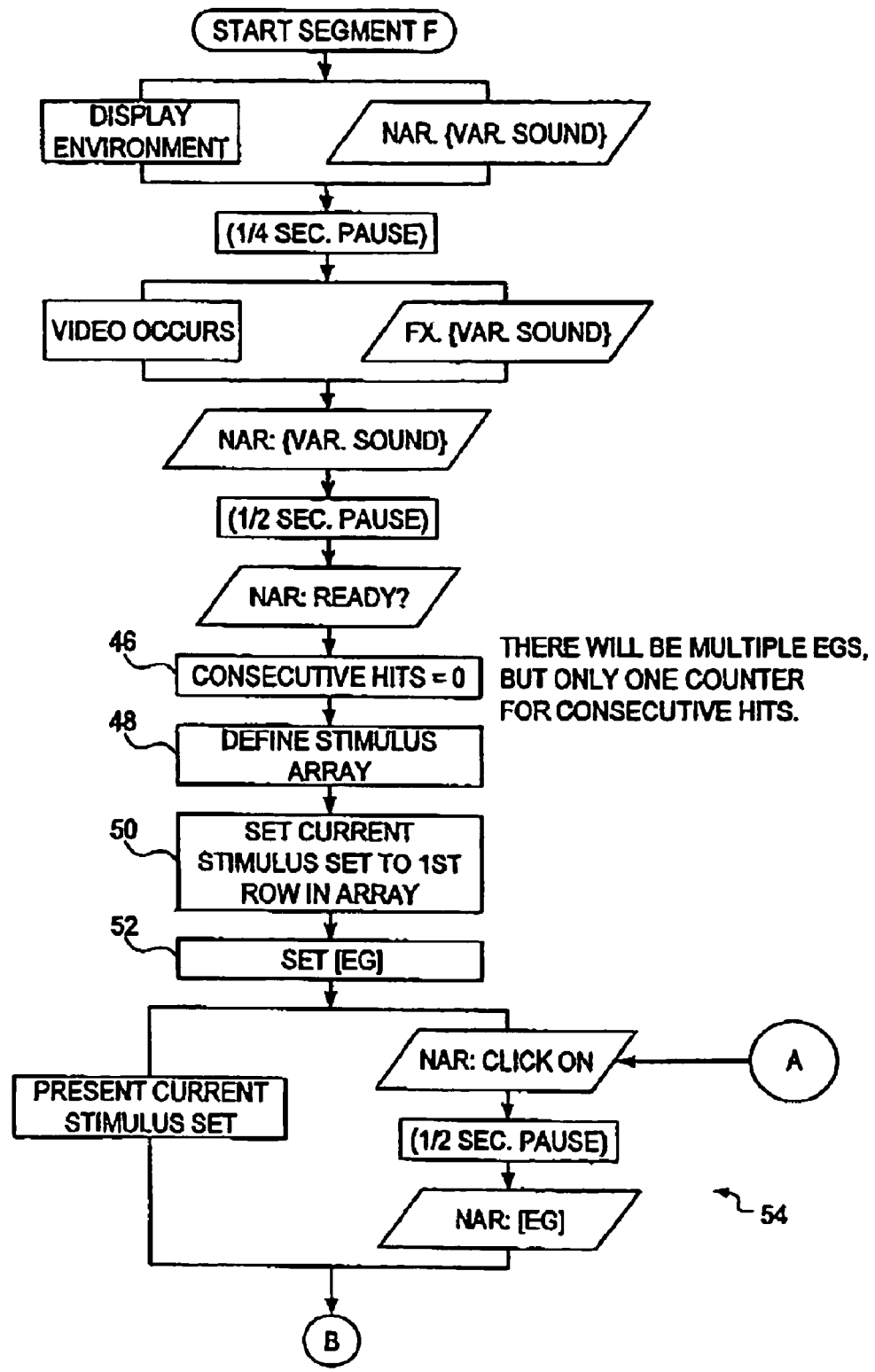
FIGS. 2–4 are flowcharts depicting an embodiment of an establishing routine for a teaching method that can be implemented using the system of FIG. 1.
Figure 3:
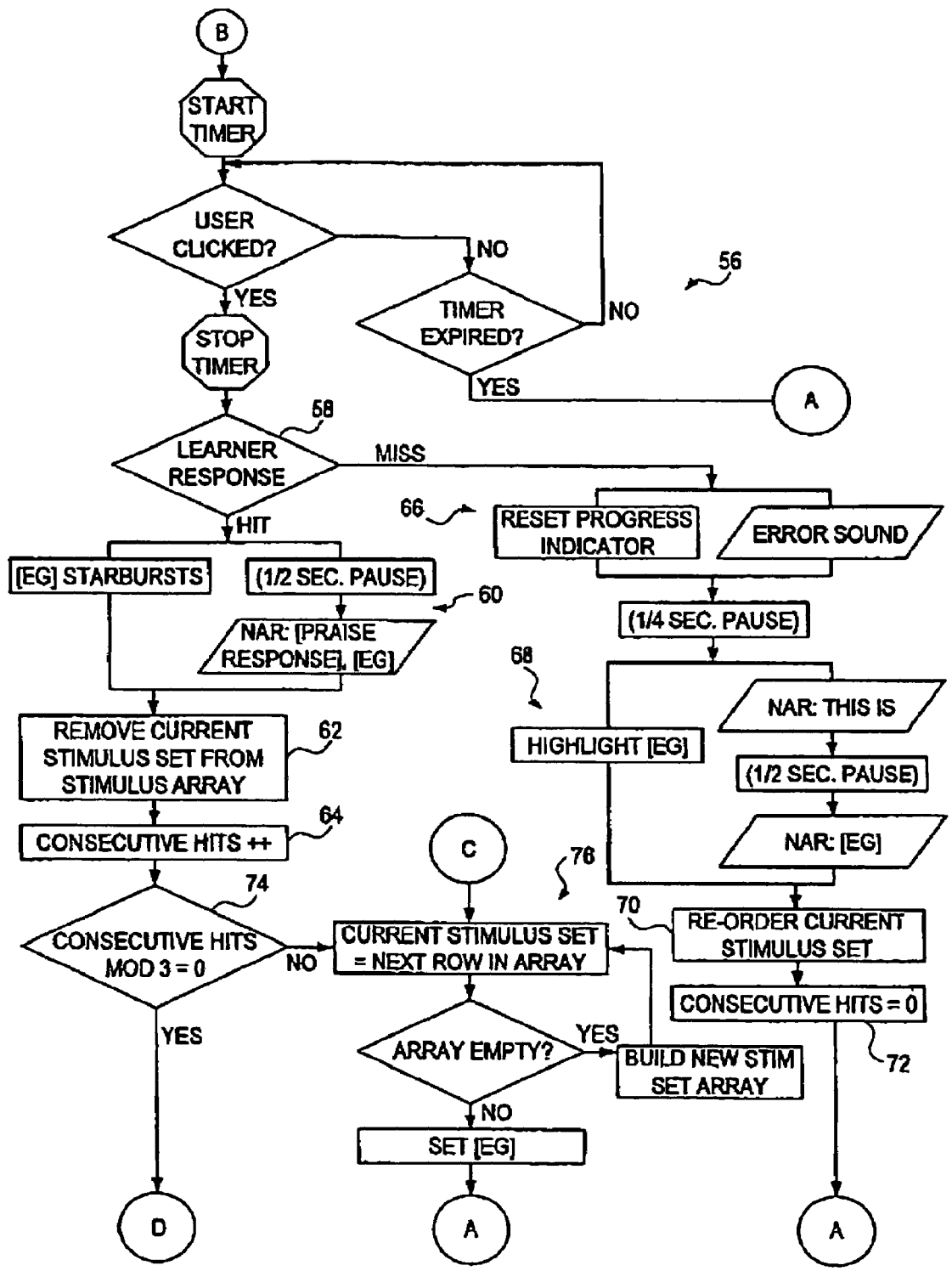
Figure 4:
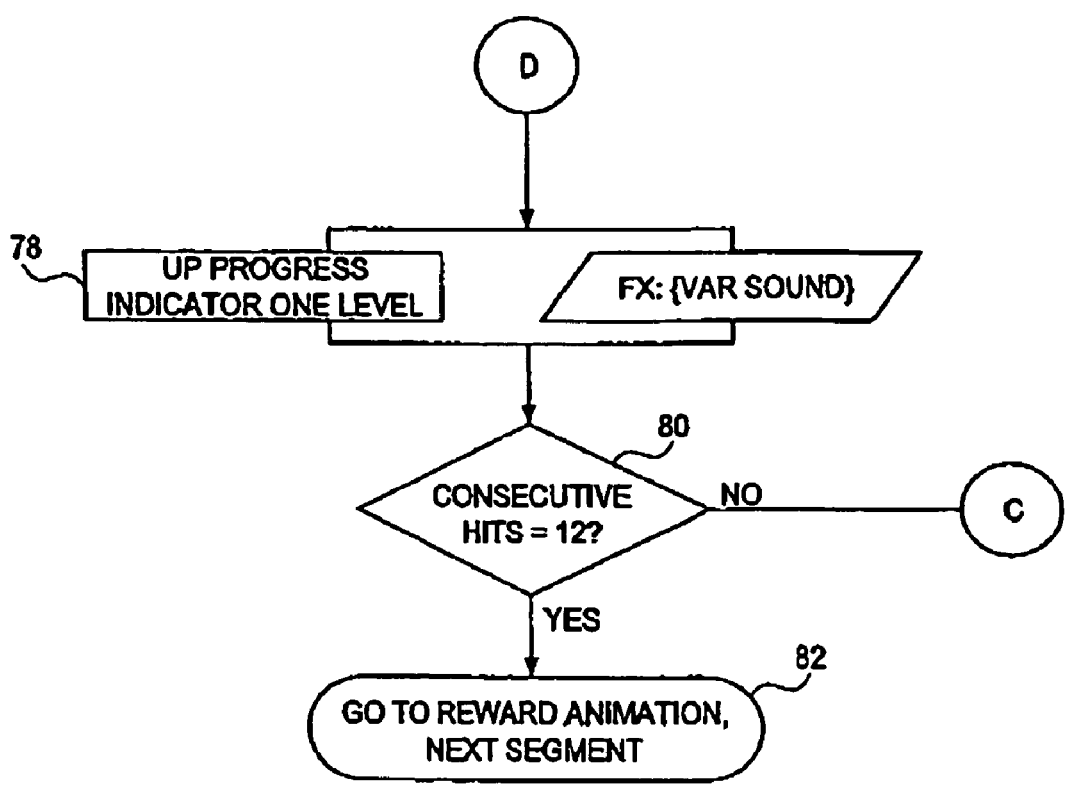

FIGS. 2–4 are flowcharts illustrating an example of an establishing routine F for conditional discrimination. In these flowcharts and in other flowcharts illustrated elsewhere in the figures, the encircled letters indicate where the various flowcharts interconnect. In FIG. 2, a counter of consecutive "hits" or number of consecutive correct clicks is initially set at 0 at a block 46. An array of elements, including "s" and "ee" elements with other elements, for example, is defined at a block 48. The stimulus to be presented to the child is set at the first row of the array at a block 50. At a block 52, the first example to be selected by the child is set, which may be an "s" element or an "ee" element. At blocks 54, the row is presented to the child along with an audible prompt to click on the currently set example ("Click on the letter ['s' sound]").

The child's response may be timed at blocks 56 in FIG. 3. If the child clicked correctly at a decision block 58, then positive feedback is provided at a block 60. The current row is removed from the array at the block 62, and the consecutive hits counter is incremented by 1 at a block 64.

Figure 13:
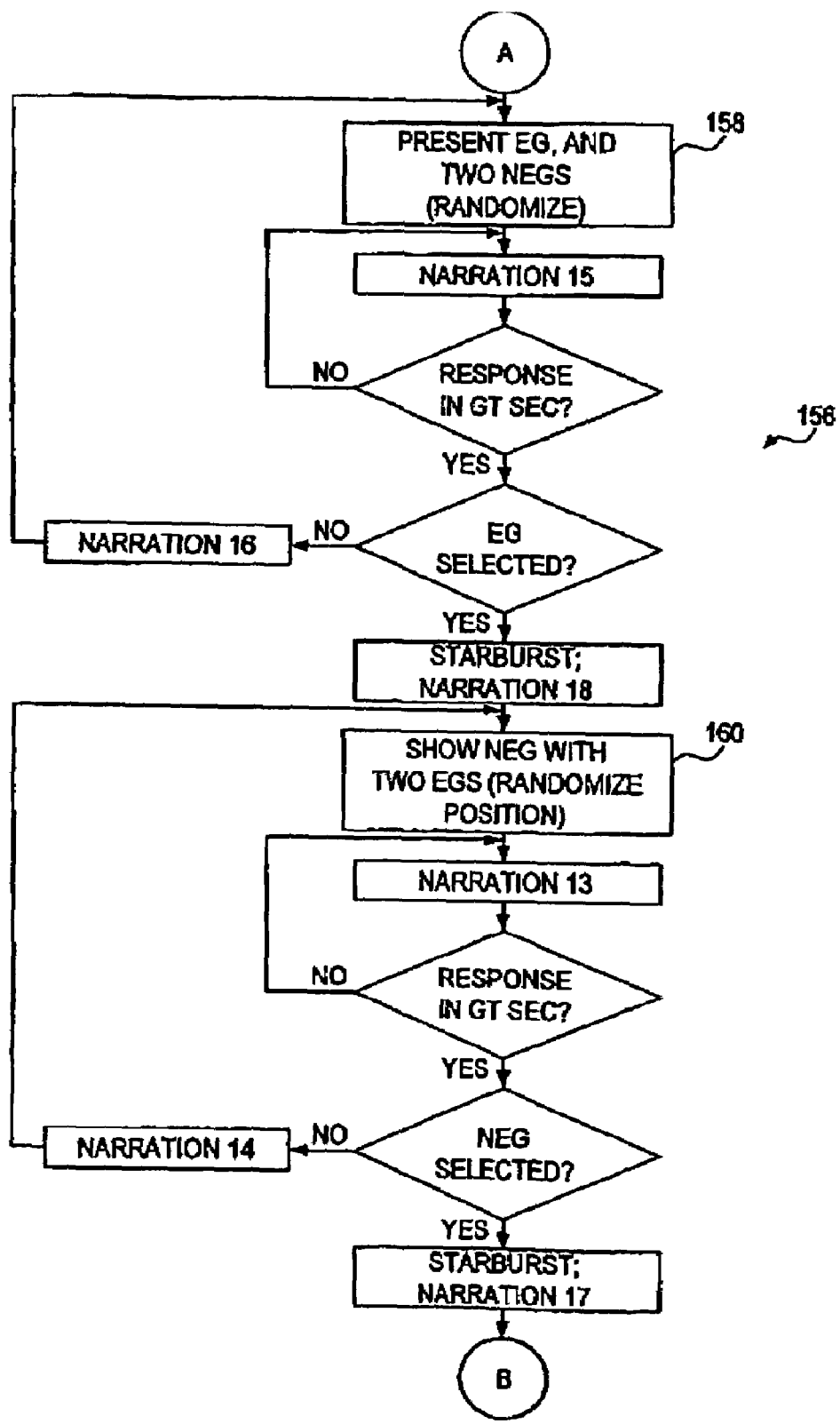
FIGS. 13–14 are flowcharts depicting an embodiment of a correction subroutine that can be used in conjunction with the fluency routine of FIGS. 10–11.
Figure 14:
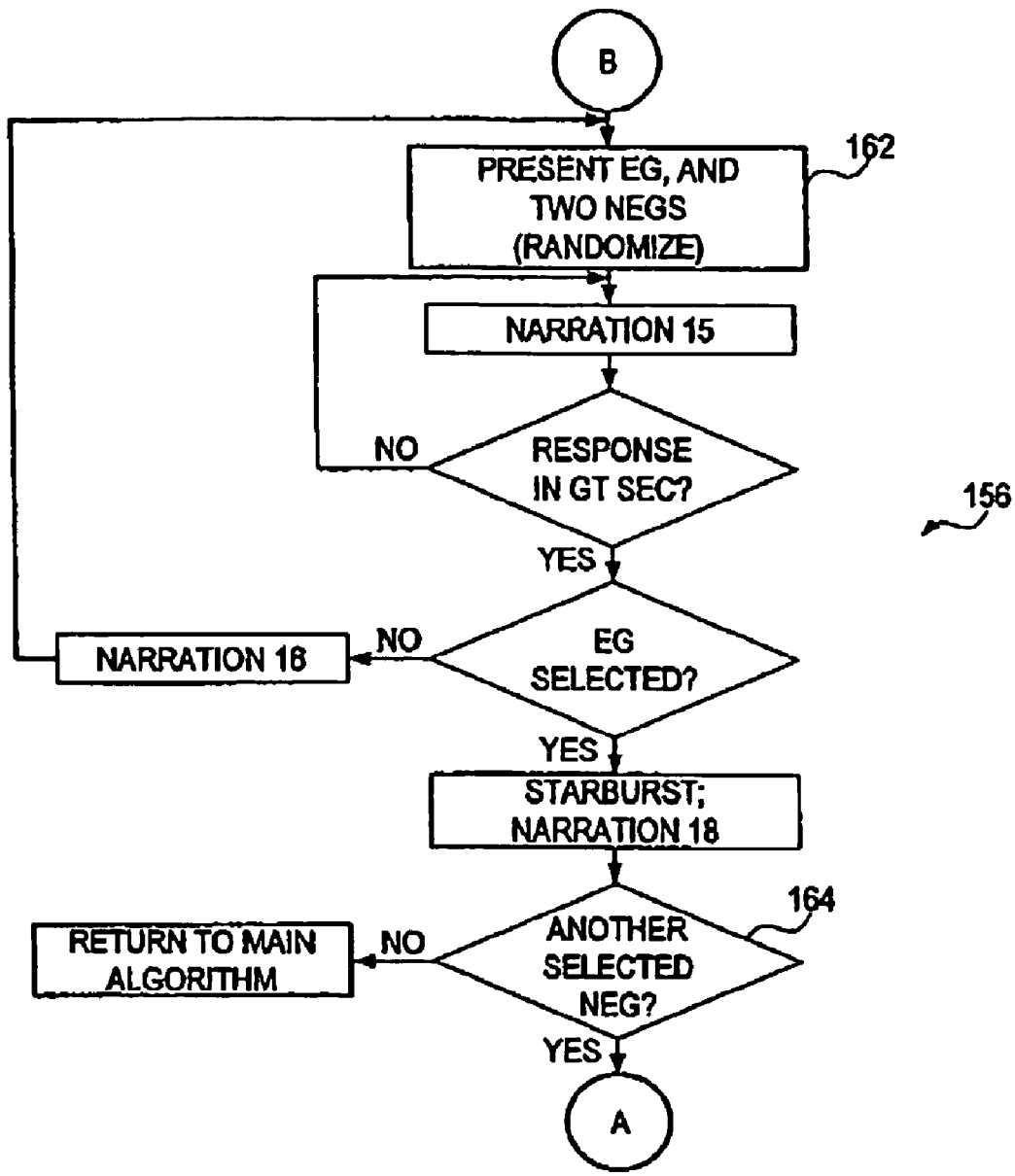

If at the decision block 58, however, the child clicked incorrectly, then an error sound and reset of a progress indicator occurs at blocks 66. At blocks 68, the routine may redisplay or otherwise re-present the correct element to the child so that the child can identify it the next time it is requested in a row. The current row is reordered at a block 70 and the consecutive hits counter is reset at a block 72. Thereafter, the process at the blocks 54 repeats. An example (or a suitable variation thereof) of a correction subroutine that can be used in conjunction with the establishing routine F when there are two (or any number n) of consecutive incorrect clicks or "misses" is shown in FIGS. 13–14 with respect to a fluency routine G.

Returning now to the block 64, the count of the consecutive hits is compared to a predefined threshold (such as 3) at a decision block 74. If the count has not yet reached the threshold, then at the blocks 76, the next row (and its example) is set or a new array is built if the last row has been reached. Thereafter, the process at the blocks 54 repeats. If at the decision block 74, however, the count of consecutive hits has reached the threshold, then the progress indicator is increased by one level at a block 78 in FIG. 4. If the count of consecutive hits has reached 12 clicks or other threshold in a decision block 80 in FIG. 4, then a reward (such as animation) is played to the child at a block 82, and the child moves to the next routine. If the number of consecutive hits has not reached the threshold at the decision block 80, then the process in the blocks 76 repeats. Conditional discrimination routines can be used whenever the correct stimulus to be chosen varies with the presence or absence of another stimulus. The stimulus, conditional stimulus, and behavior may vary in component size, intensive, or durative properties.

Figure 5:
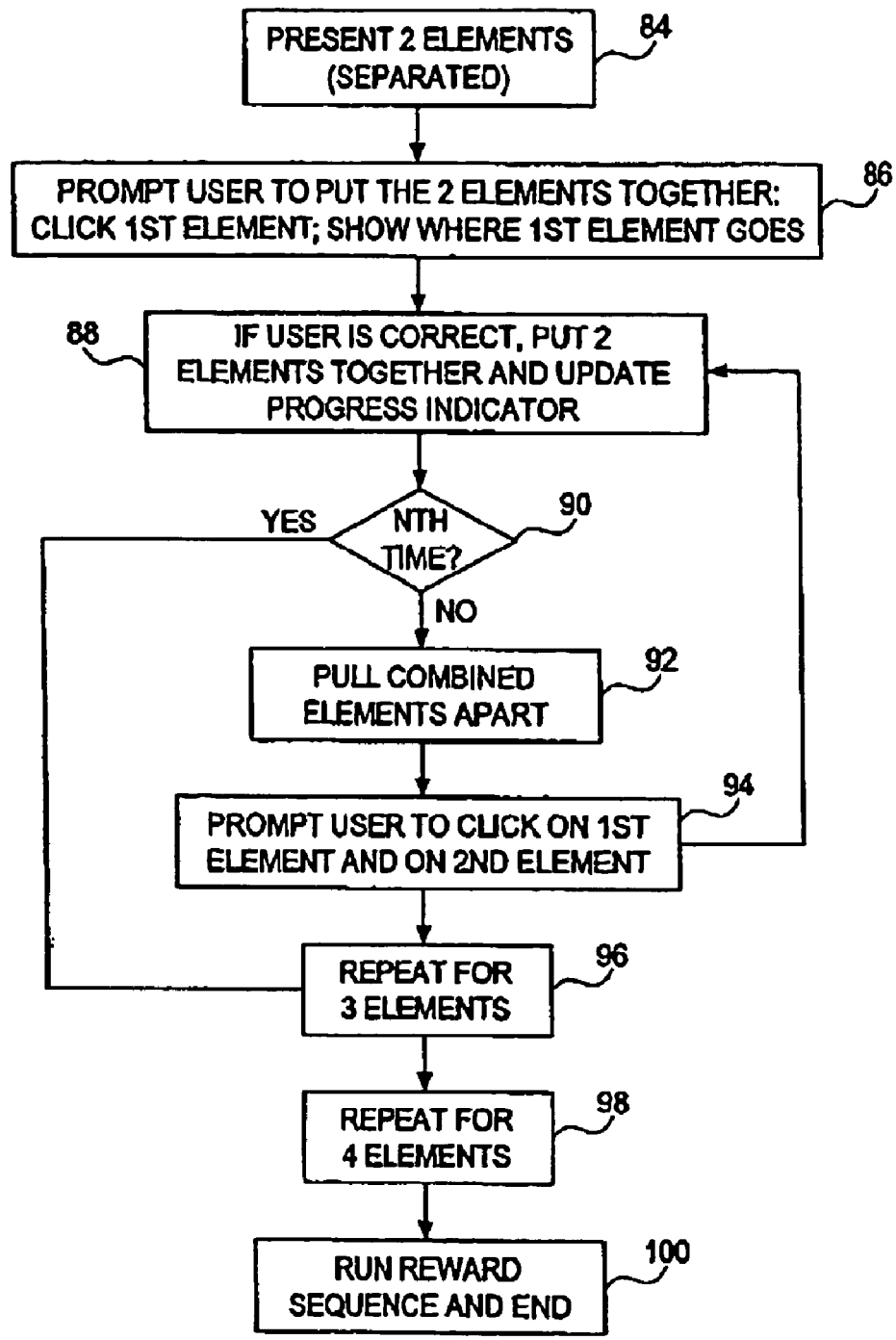
FIG. 5 is a flowchart depicting an embodiment of a blending and segmenting routine for a teaching method that can be implemented using the system of FIG. 1.

Shown next in FIG. 5 is an example of the building of a composite skill, as illustrated in the blending and segmenting routine P (or "composite routine" P) for Part 3 of Episode 1, to teach the child that the elements "s" and "ee" can be combined/separated. The illustrated embodiment of the blending and segmenting routine P teaches discrimination and recognition, so that the child can identify specific sounds that make up a word (discrimination and recognition), and teaches this skill by making the child put together individual components into composites. For simplicity of explanation and illustration, blocks for timing, providing feedback to the child, and incrementing of progress indicators are not shown or described in detail in FIG. 5, since such details would be familiar to those skilled in the art based on the description provided herein.

Beginning at a block 84, the elements "s" and "ee" are displayed separately to the child. Subsequently at a block 86, the child is prompted to put the two elements together. This may be done by prompting the child to click on the first element "s," and then to click where the element "s" is to go. If the child correctly clicks, then the two elements are blended together at the block 88 for display to the child (accompanied by an audible feedback of the composite sound), and the child's progress indicator is updated.

In accordance with an embodiment of the invention, the foregoing may be repeated and so at a decision block 90, the routine checks to see whether the blending has been done for an Nth time, such as a second or any suitable number of times. If not, then the elements are pulled apart at a block 92. The elements may be pulled apart or segmented at the block 92 automatically, or in response to prompting the child to identify/click each element. After being segmented at the block 92, the child is prompted to click on each element. If the child clicks correctly, then the elements are combined at the block 88 and the above-described process repeats.

If the process has been repeated more than N times at the decision block 90, then the same process described above can be performed/repeated-for 3 elements. That is, the elements "s" and "ee" are displayed along with an unfamiliar element, and the child is prompted to put the "s" and "ee" elements together. Thus, the child has to recognize that the third element is not an "s" or an "ee," and respond by choosing the other two elements. This exercise can be extended to 4 or more elements at a block 98, with the various exercises at the blocks 96–98 involving items such as rearranging the appearance, location, sequence, etc. of the presented separated elements so that the child can be trained to locate them. If all of the above is completed satisfactorily, then a reward sequence is run at a block 100 and the routine ends. Composite routines can be used in situations when the learner may be required to assemble previously acquired component skills in order to perform a more elaborate skill or strategy. In one embodiment, some or all contextual features are included that govern the blending, ordering, and/or rearrangement of components such that the learner can produce the behavior requested by the situation.

The establishing routine C that can be used in Part 3 of Episode 1 in another embodiment (not shown), involves presentation of an example that "morphs" or changes into a nonexample. This may be used to show learners the difference between one presentation and another without requiring the learner to inspect two stimuli and compare them. For example, if two words differ by only one letter, juxtaposing the two in a continuous conversion or morphing format can greatly facilitate their later discrimination. The continuous conversion method can also be used in correction routines and when introducing new phonic elements that are similar to those previously learned.

Part 4 of Episode 1 can include further introduction to blending and segmenting in another embodiment, and may be combined with or separate from the prior parts of Episode 1 according to various embodiments of the invention. Next in Parts 1–3 of Episode 2, the establishing routines A, B, D, and/or F are provided for another set of elements "v," "an," and for both "v" and "an." For simplicity of explanation, application of these establishing routines to these elements is not provided in further detail herein.

In Part 4 of Episode 2, the teaching method involves an adduction routine E as applied to the element "n" and "an." An embodiment of the adduction routines comprises a subset of establishing routines that promote the rapid acquisition of new skills with little or no direct learner instruction. Environments are created that recruit elements of previously learned skills into new skill sets, obviating the need to build these new elements independently. One embodiment of the adduction routines has uniquely designed presentation, confirmation, and correction subroutines. Although described herein in the context of teaching reading, an embodiment of the adduction routine may be employed to teach any type of paired associate, multiple discrimination, algorithmic, concept, principle, or strategy learning objective.

A first type of adduction routine presents an oddity discrimination, followed by the discrimination segment used in the establishing routine in which the learner discriminates between a sound element and juxtapositions of other similar sounds, such as between "n" and "an." A second type of adduction routine combines two or more formerly established elements into a new element to be discriminated against other familiar and similar sound element juxtapositions, without direct teaching (without using the A, B, D sequence, for instance). FIGS. 6–9 are flowcharts illustrating an example of an adduction routine E that includes the oddity discrimination leading to the type of control described in F above. For simplicity of explanation, only the components of interest in the flowcharts of FIGS. 6–9 are described in detail herein.

Figure 6:
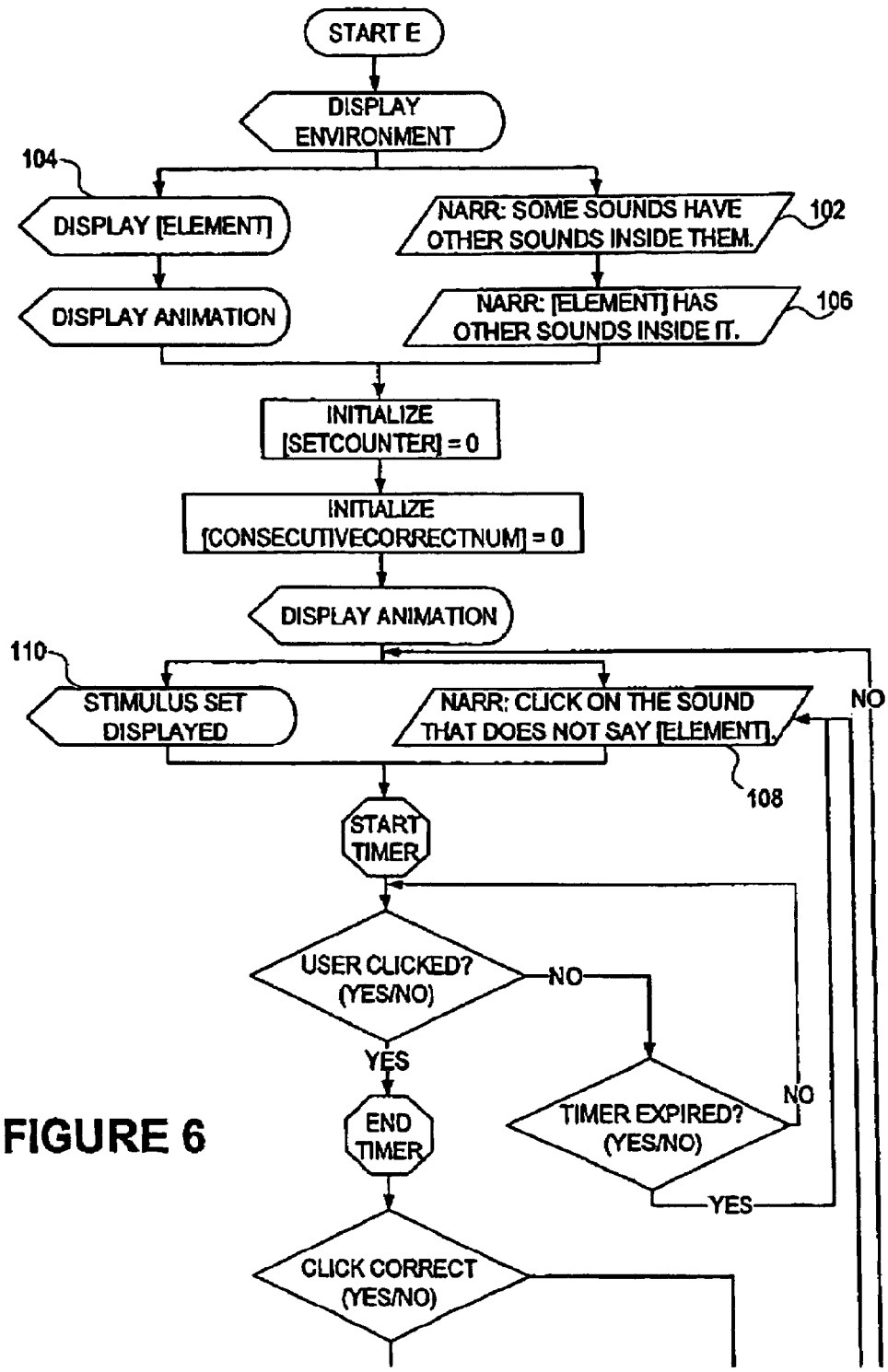
FIGS. 6–9 are flowcharts depicting an embodiment of an adduction routine for a teaching method that can be implemented using the system of FIG. 1.

Beginning at a block 102 in the flowchart of FIG. 6, the routine states to the user that "Some sounds have other sounds inside them" and presents a particular element at a block 104. At a block 106, the routine states to the user that "[element] has other sounds inside it." A stimulus set is presented at a block 110 that includes the relevant element plus other elements. At a block 108, the user is prompted to click on the sound (or a graphic) in the stimulus set that does NOT say the relevant element.

Figure 7:
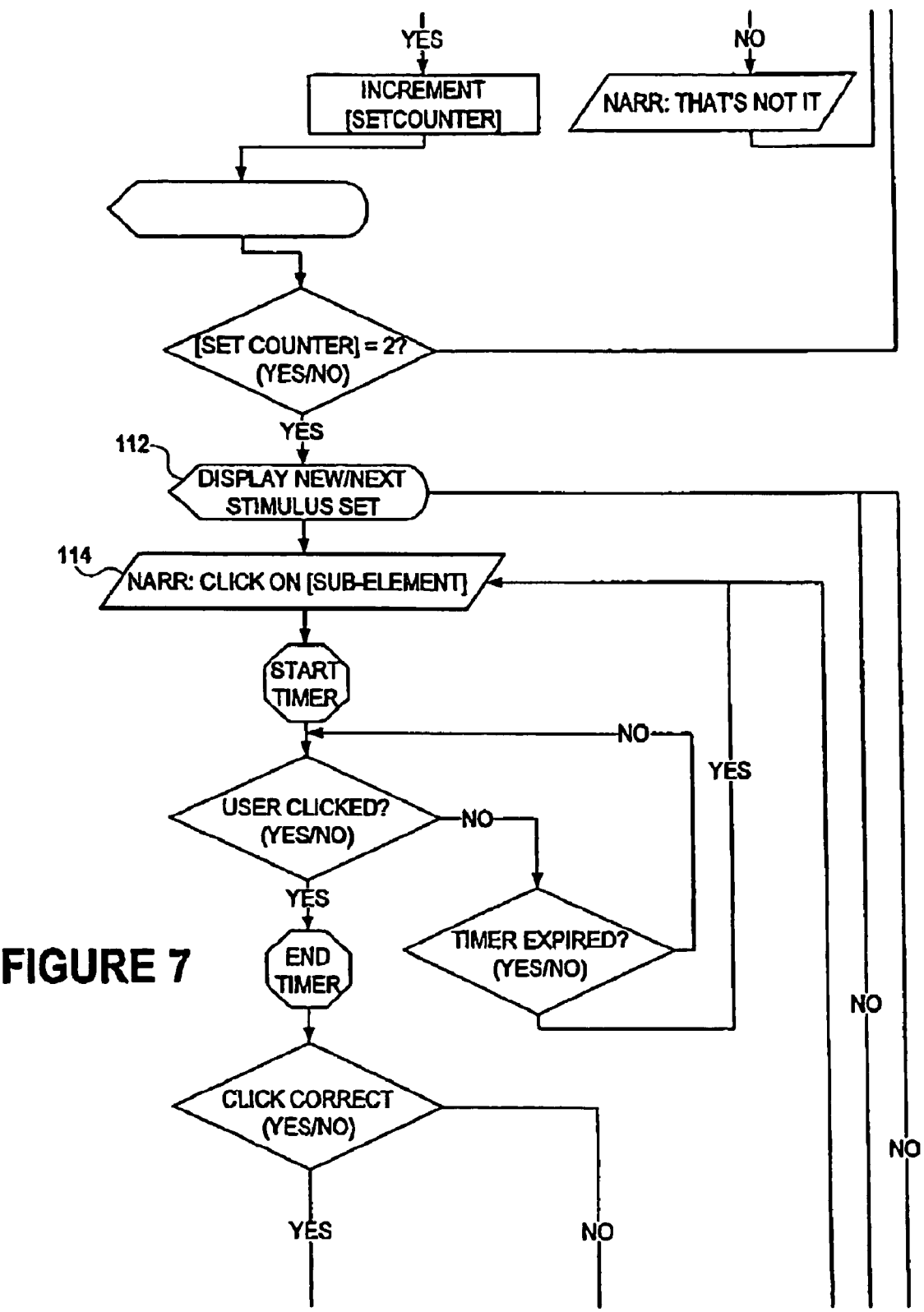
Figure 8:
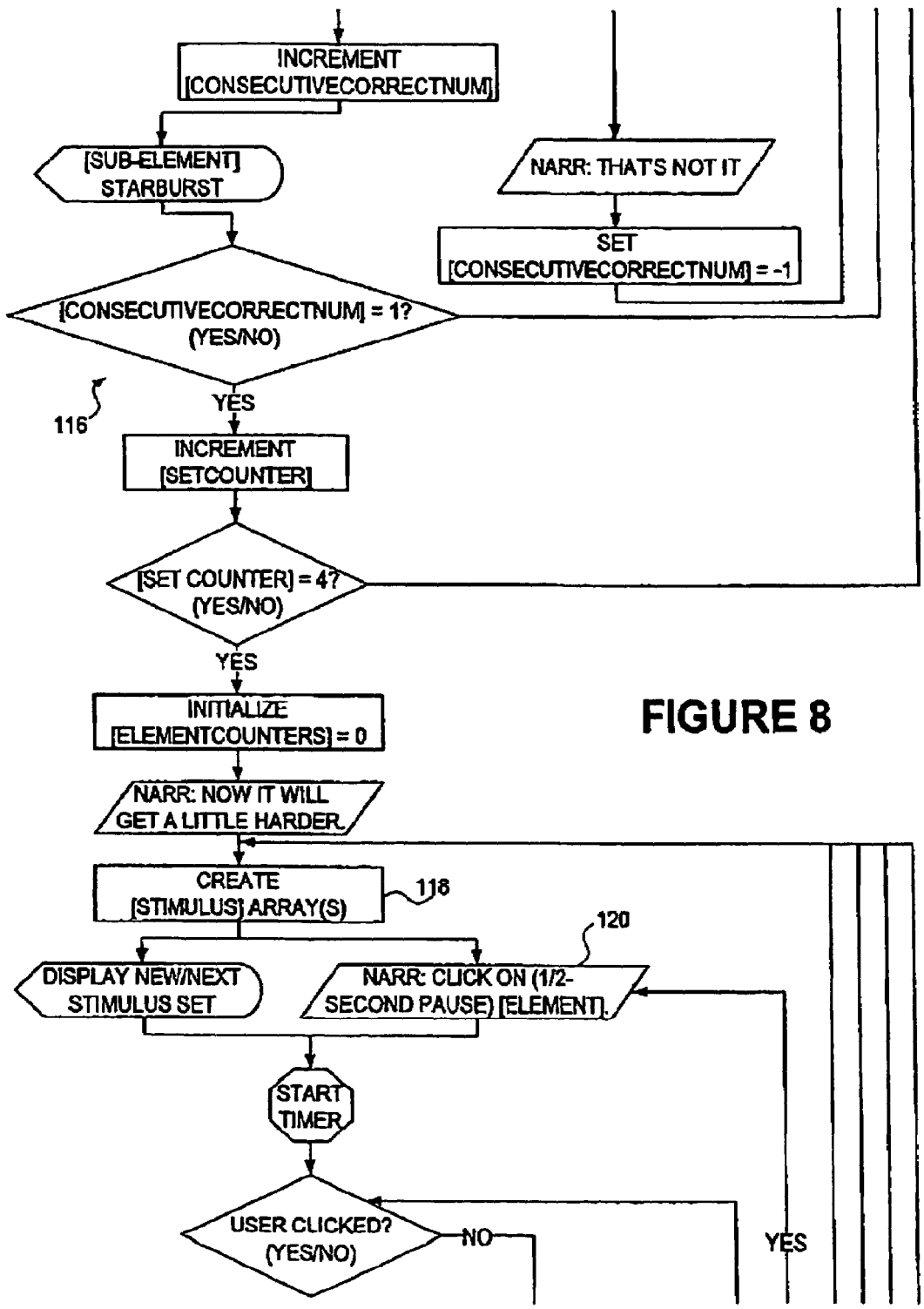
Figure 9:
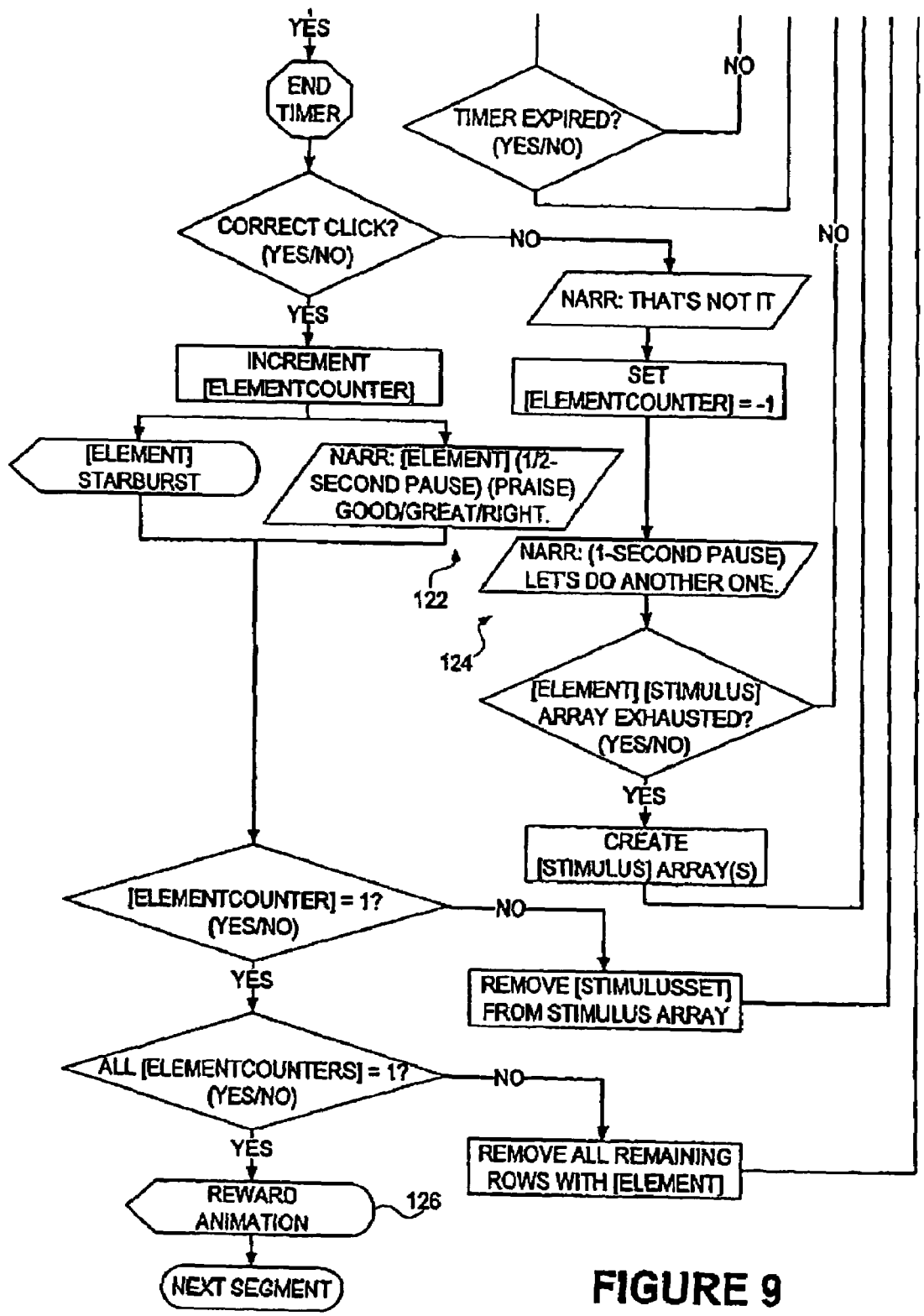

If the user clicks correctly, the process may be repeated to remove other elements from the stimulus set, until a new stimulus set is presented at a block 112 in FIG. 7, which has the relevant element. At a block 114, the user is prompted to click on an element other than the relevant element in the stimulus set. In FIG. 8, various counters are incremented/decremented at the blocks 116 as the user continues to try to eliminate the non-relevant elements. Upon reaching a threshold of correct clicks, additional arrays are created at a block 118, and the user is once again invited to eliminate the non-relevant elements at a block 120. Various counters to track the user's answers are incremented or decremented, respectively, in blocks 122 or 124 of FIG. 9, until the user successfully completes the exercise and is rewarded at a block 126.

Other embodiments of adduction routines can be used in non-reading programs. In mathematics, for example, learners who have mastered fractions computation skills and word problem solving involving whole numbers can learn to solve fractions word problems by combining the two previously mastered repertoires. In writing, as another example, learners who have learned to place commas in independent clauses, and write vocabulary definitions, can learn to place appositives in sentences by combining the two previously mastered repertoires. Adduction routines based upon embodiments of the invention that are disclosed or taught herein can build these repertoires without the need for direct teaching.

Next in Part 5 of Episode 2, the conditional discrimination establishing routine F is performed for the elements "an" and "n." Then, a fluency routine G is performed at Part 6 of Episode 2 for the elements "s," "ee," "v," "an," and "n." It is noted that alternatively, these routines may be performed according to Parts 7 and 8 identified above, in another embodiment.

An embodiment of a fluency routine, such as the fluency routine G, comprises designed, timed, guided-practice exercises that allow retention of newly acquired reading skills after significant periods of no practice, and make subsequent application of those skills by the learner much more likely. An embodiment of a fluency routine comprises constructed practice aims, confirmation routines, and correction routines, which are unique to the practice environment.

One embodiment of the fluency routine can also be designed to adapt to the learner's practice history and to automatically set practice goals based on that history. The practice targets are, in part, based upon a unique "celeration determination routine," which determines a minimal acceptable progress in the exercise for each individual learner. Although currently implemented to teach reading, these fluency routines may be employed, to teach any type of paired associate, multiple discrimination, algorithmic, concept, principle, or strategy learning objective.

Figure 10:
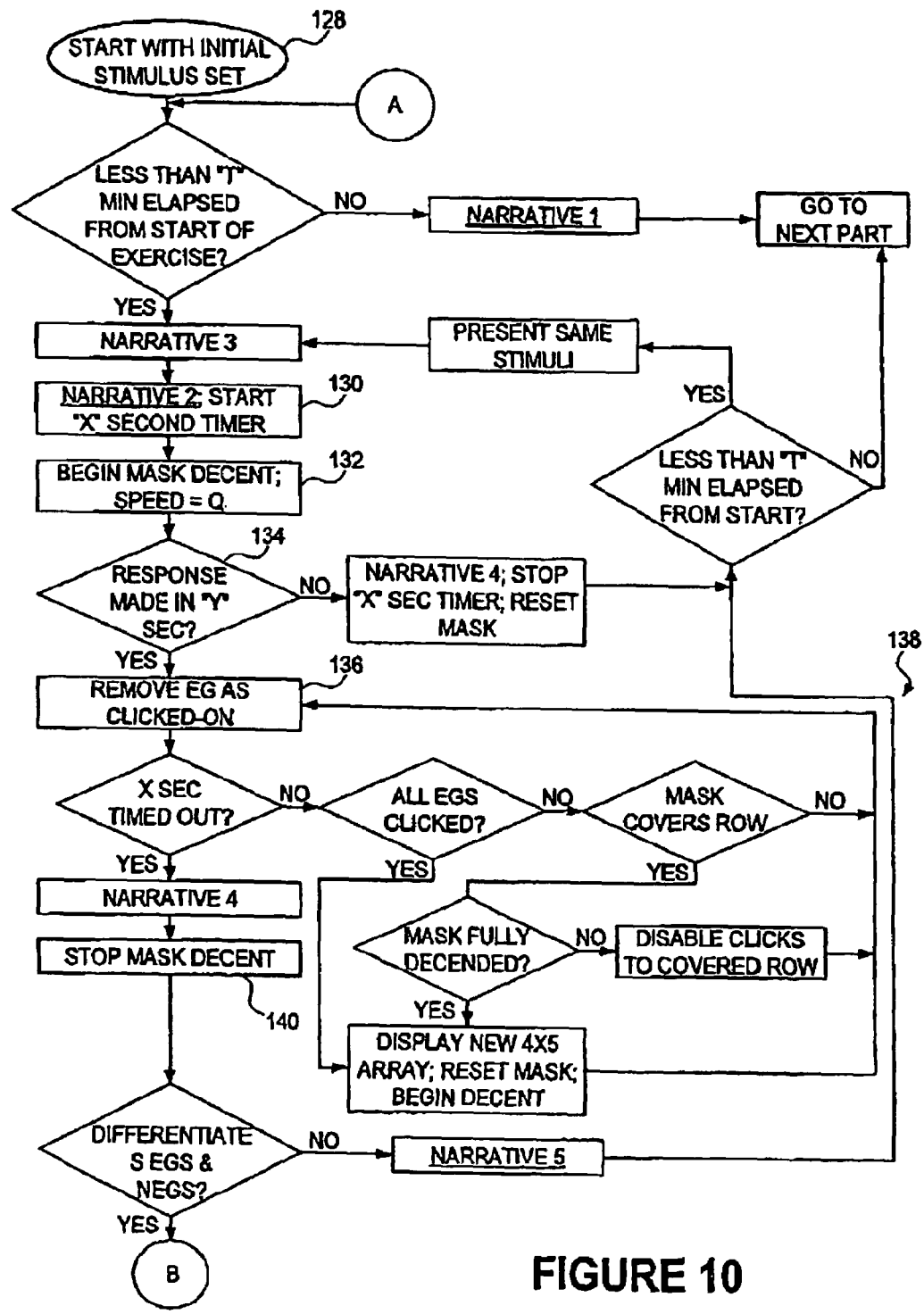
FIGS. 10–11 are flowcharts depicting an embodiment of a fluency routine for a teaching method that can be implemented using the system of FIG. 1.
Figure 11:
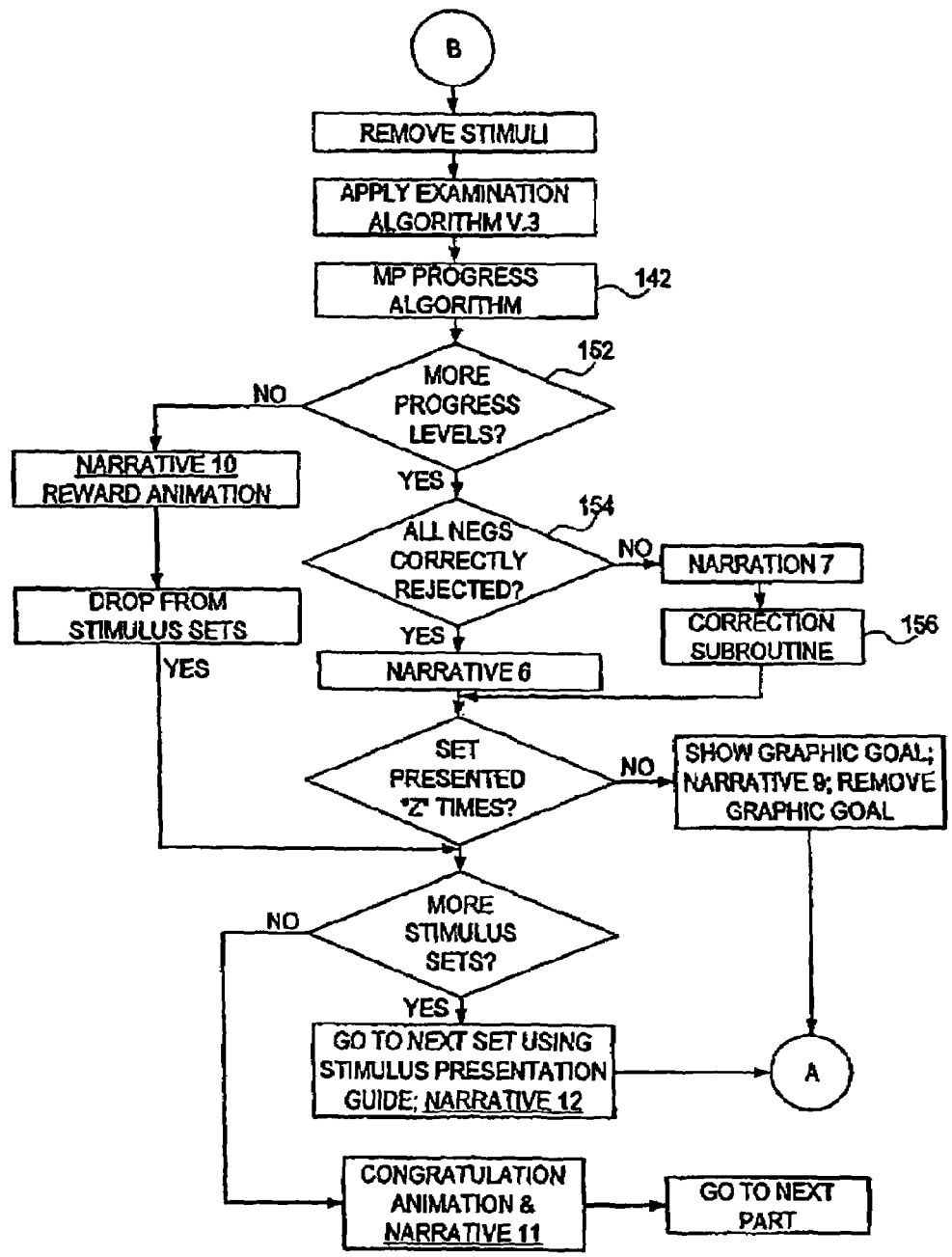

FIGS. 10 and 11 are flowcharts illustrating an embodiment of the fluency routine G. For simplicity of explanation, only components of interest in the flowcharts will be described in detail herein. In general, the embodiment of the fluency routine shown in FIGS. 10 and 11 present an array (such as a 4×5 array) having examples and nonexamples to the user. The user then has to select all occurrences of an element from the array within a specified period of time.

Beginning at a block 128 in FIG. 10, an array or stimulus set is presented to the user. A timer is set at a block 130, and a "mask" slowly descends over the array at a block 132 to cover the elements in the array. Meanwhile, at a block 134, the user clicks on as many examples as he/she can identify; and each example is removed from the array as it is clicked at a block 136. Blocks 138 contain narratives and decision blocks to trigger repeat/reset of the fluency algorithm for the remaining elements in the array(s).

Figure 12:
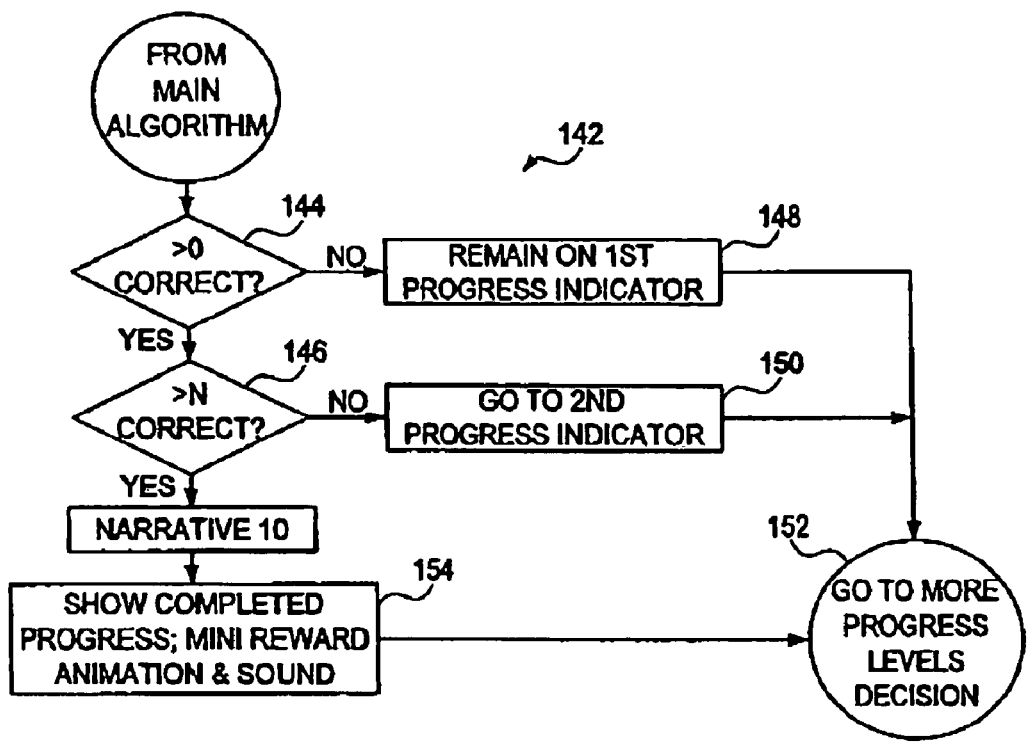
FIG. 12 is a flowchart depicting an embodiment of a fluency progress algorithm that can be used in conjunction with the fluency routine of FIGS. 10–11.

When the timer has timed out, the descent of the mask is stopped at a block 140. Next at a block 142 in FIG. 11, a fluency progress algorithm is performed to determine whether the user is capable of being advanced to a next level. An embodiment of the fluency progress algorithm 142 is shown in FIG. 12. At a decision block 144, the fluency progress algorithm 142 determines whether the number of correct clicks is greater than zero. If it is not, then the progress indicator remains at the first level. If at a decision block 146 the number of correct clicks is greater than a number n, then the show is completed at a block 154, and returns to the main algorithm of FIG. 11 at a decision block 152, where it is determined whether additional progress levels exist.

Next at a block 154, the fluency routine determines whether all nonexamples were correctly rejected by the user. If some nonexamples were not correctly rejected, then a correction subroutine is performed at a block 156 to teach or induce the user to correctly identify examples and nonexamples, thereby increasing the likelihood that the user will correctly identify other examples or nonexamples in other future exercises. FIGS. 13–14 illustrate an embodiment of the correction subroutine 156 for the fluency routine G (and also for a fluency routine L). In a block 158 in FIG. 13, the user is prompted to select an example that is presented with two nonexamples. In a block 160, the user is prompted to select a nonexample that is presented with two examples. In a block 162 of FIG. 14, the user is again prompted to select an example that is presented with two nonexamples. Eventually, the correction subroutine 156 can repeat at a decision block 164 if there were any other nonexamples from the main algorithm in FIGS. 10–11 that were not correctly rejected.

Figure 15:
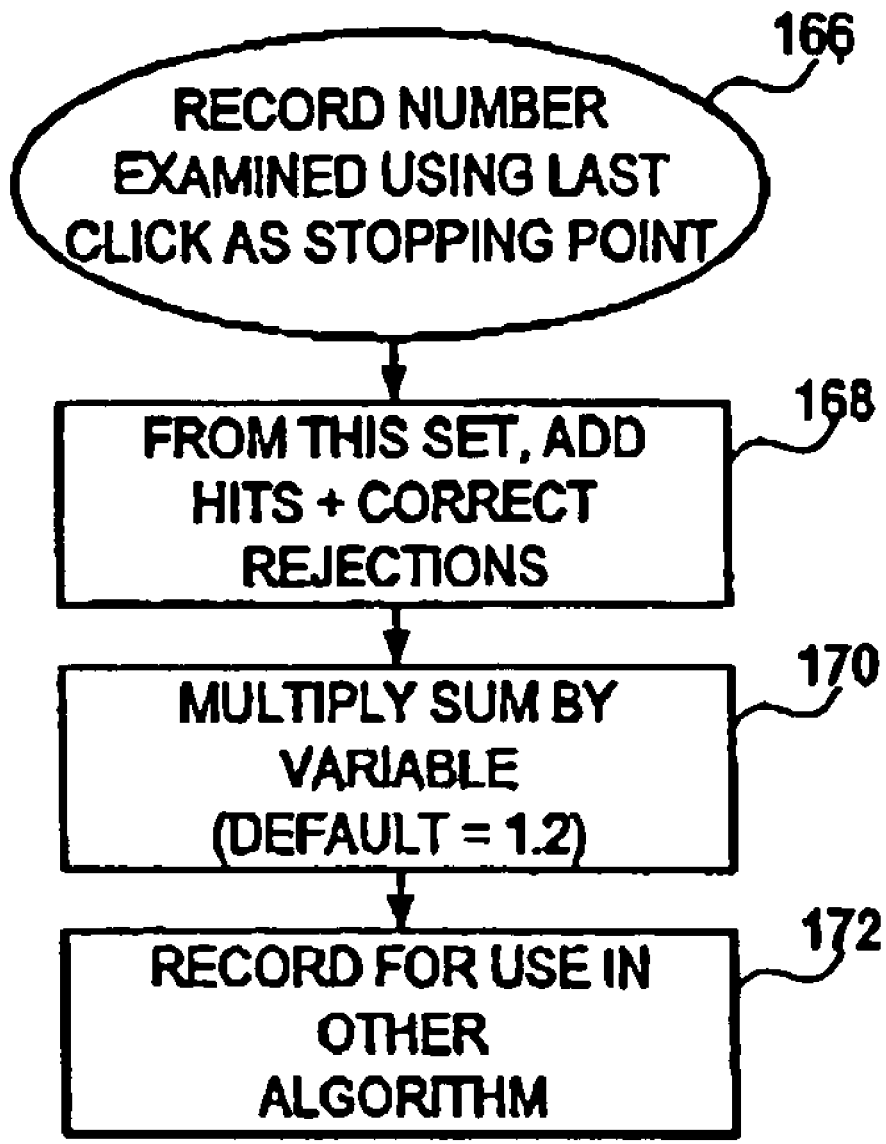
FIG. 15 is a flowchart depicting an embodiment of a celeration algorithm that can be used in conjunction with the fluency routine of FIGS. 10–11.

FIG. 15, shows an embodiment of a celeration algorithm that can be used in conjunction with the fluency algorithm of FIGS. 10–11 or with other fluency algorithms. As described above, celeration algorithms determine minimal acceptable progress in a given exercise for each individual learner. That is, based on the rate/number of correct clicks in a first exercise, a goal is set for what the rate/number of correct clicks should be in a second exercise. In the embodiment shown in FIG. 15, a number of clicks is recorded at a block 166. From this number at a block 168, the hits and/or correct rejections are added. At a block 70, the resulting sum is multiplied by a variable. In accordance with an embodiment of the invention, the variable can vary from one user to another. Thus, quicker, learners may have a larger variable, while slower learners may have a smaller variable. In this manner, the celeration algorithm (and underlying exercises) can be customized based on the learning speed of each individual user. Next at a block 172, the resulting number is recorded for later use in other algorithms. The celeration algorithm may also alert the system 10, in one embodiment, to provide additional instruction, corrections, games, or other motivational interventions to accelerate a learner who is not progressing at a minimal standard.

Referring next to Part 1 of Episode 3, a type of blending and segmenting routine Je is applied to the elements "s" and "ee." In the subsequent parts of Episode 3, various other blending and segmenting routines Ka, Pm, and P are applied. In parts of Episode 4, the blending and segmenting routine Ke is applied.

An embodiment of the blending and segmenting routine teaches the learner a strategy for using the sound elements to decode a word. The strategy makes the learner hold each sound in a word until the next sound is vocalized, thereby greatly reducing auditory memory as the sounds are chained together to make a word. The strategy also instructs learners, for instance, to make a continuous movement with their finger as they touch each element and move to the next element, while simultaneously saying each sound and blending it with the previous sounds. The learner says the stretched word quickly, as one would normally say the word. One embodiment of the blending and segmenting routine comprises a four-step sequence for teaching each part of the strategy, and chaining the steps together.

As an illustration, the learner watches cartoon characters use the strategy, and clicks to indicate whether or not the character performed the strategy correctly. First, the learner clicks to indicate whether or not the character blended with gaps between the sounds. Next, the learner clicks to indicate whether or not the character said the sounds while looping, in synchrony. Next, the learner clicks to indicate whether or not the character followed the stretched word by saying the word quickly. Then, the learner clicks to indicate whether or not the character produced the correct sounds during blending.

Figure 16:
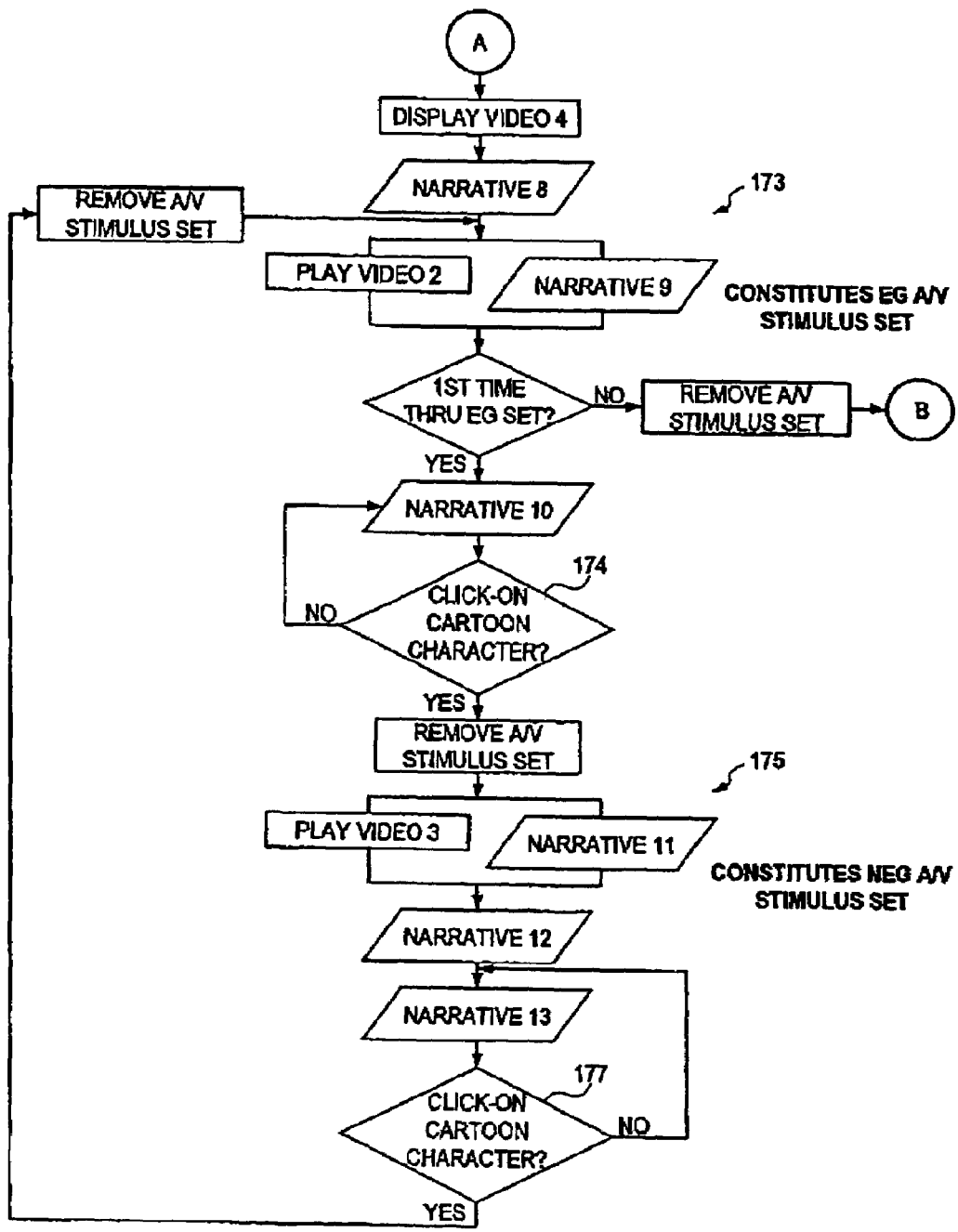
FIGS. 16–17 are flowcharts depicting an embodiment of a blending and segmenting routine for a teaching method that can be implemented using the system of FIG. 1.
Figure 17:
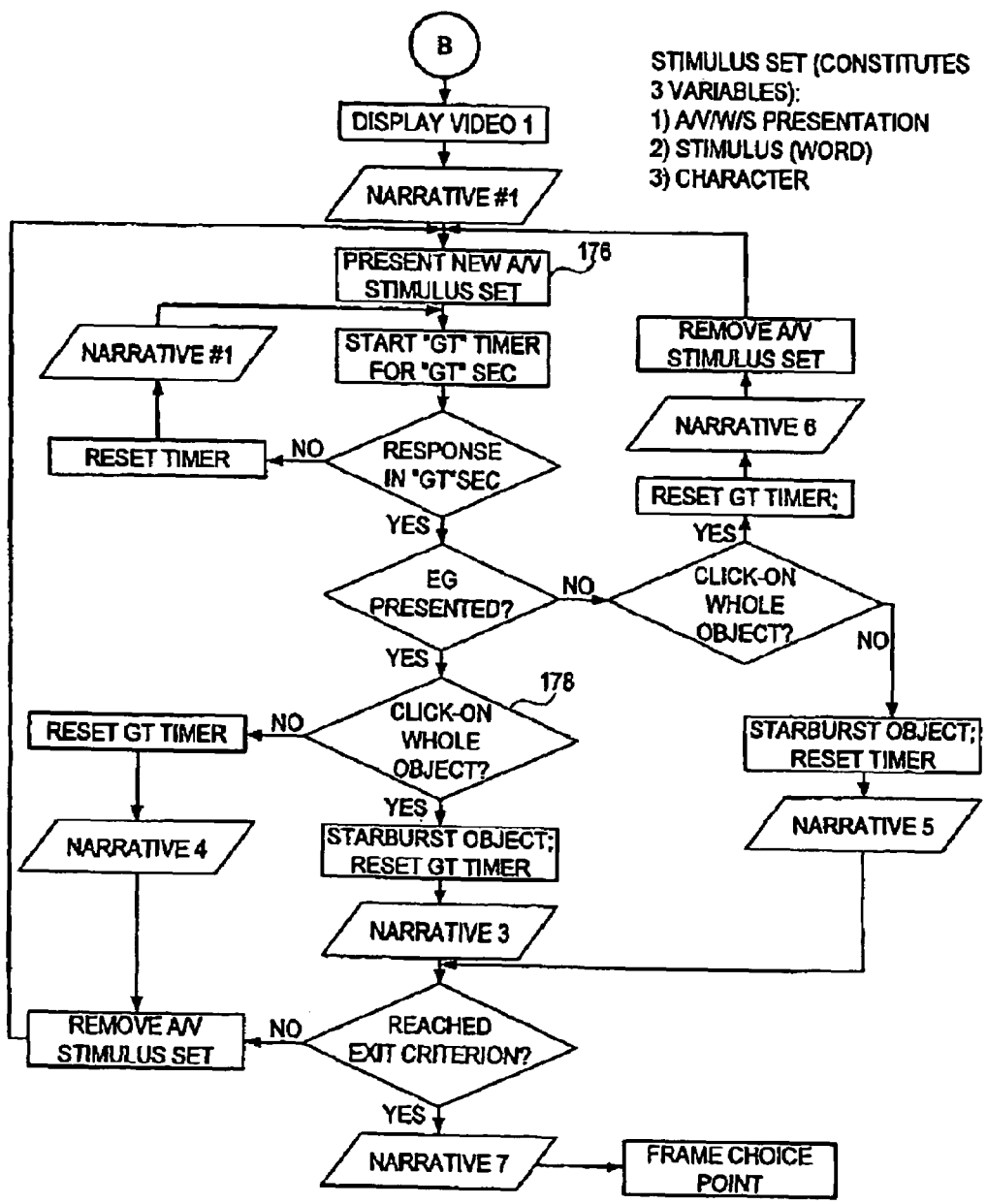
Figure 18:
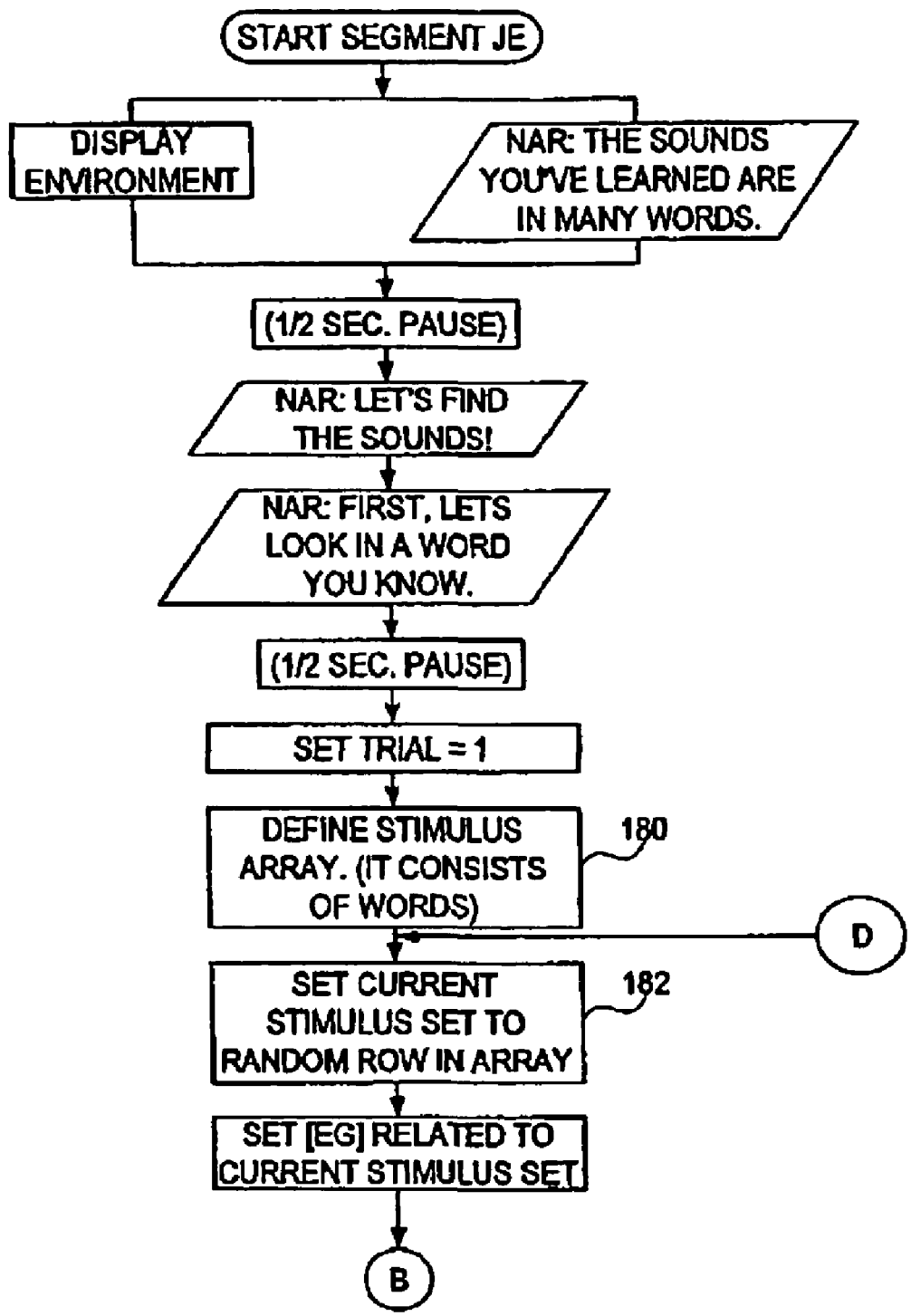
FIGS. 18–21 are flowcharts depicting another embodiment of a blending and segmenting routine for a teaching method that can be implemented using the system of FIG. 1.
Figure 19:
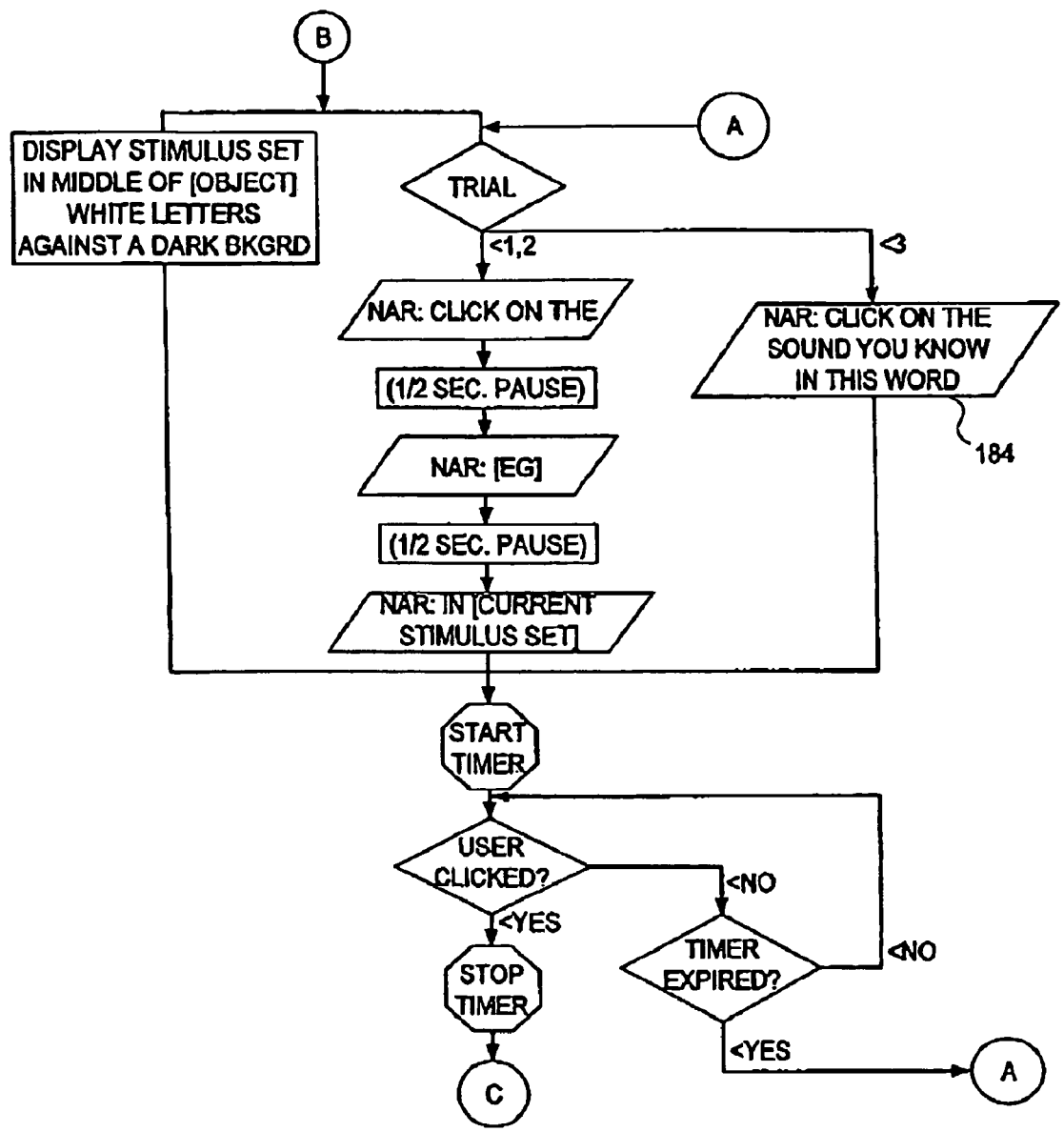

In an embodiment, the blending and segmenting routine Ka involves multiple discrimination combined with generalization, and is performed by discriminating examples from nonexamples and identifying new examples. An embodiment of the Ka algorithm is shown in FIGS. 16–17. At blocks 173 of FIG. 16, a stimulus set (such as an audiovisual cartoon) is presented to the user, and the user is invited to click on cartoon characters that said a sound correctly (an example). At a decision block 174, the algorithm checks if the user clicked on the correct cartoon character(s), and if so, a new stimulus set is presented at blocks 175. The new stimulus set presented at the blocks 175 include nonexamples, in the form of cartoon characters that the user has to listen to and identify by clicking at a decision block 177. At blocks 176 and 178 in FIG. 17, new stimulus sets are presented to the user, and the user has to determine whether or not a correct action was performed by the model. Multiple modeled actions are used in this embodiment with the sequence of teaching being a factor. First, a single action is determined to be present or absent. Later in the sequence, a second action is presented. Later still, both actions are combined. All actions are typically taught singly, and then cumulatively combined with the preceding actions until a complex routine is learned.

An embodiment of the routine Je involves identification, and is performed by identifying sounds in a word. FIGS. 18–21 are flowcharts depicting one embodiment of the Je blending and segmenting routine. In blocks 180–182 in FIG. 18, a stimulus array (or a row thereof) having words is defined and presented to the user, along with a narrative instructing the user to find previously learned sounds in the words (block 184 in FIG. 19). In accordance with one embodiment, the stimulus array contains letters with the example, with each row or stimulus set being formed such that letters along With the example make a real word, such as (cl)an, (c)ar, and so on. Programmatically, each example can be treated differently, but are displayed or otherwise presented close enough to their letters to form a real word.

Figure 20:
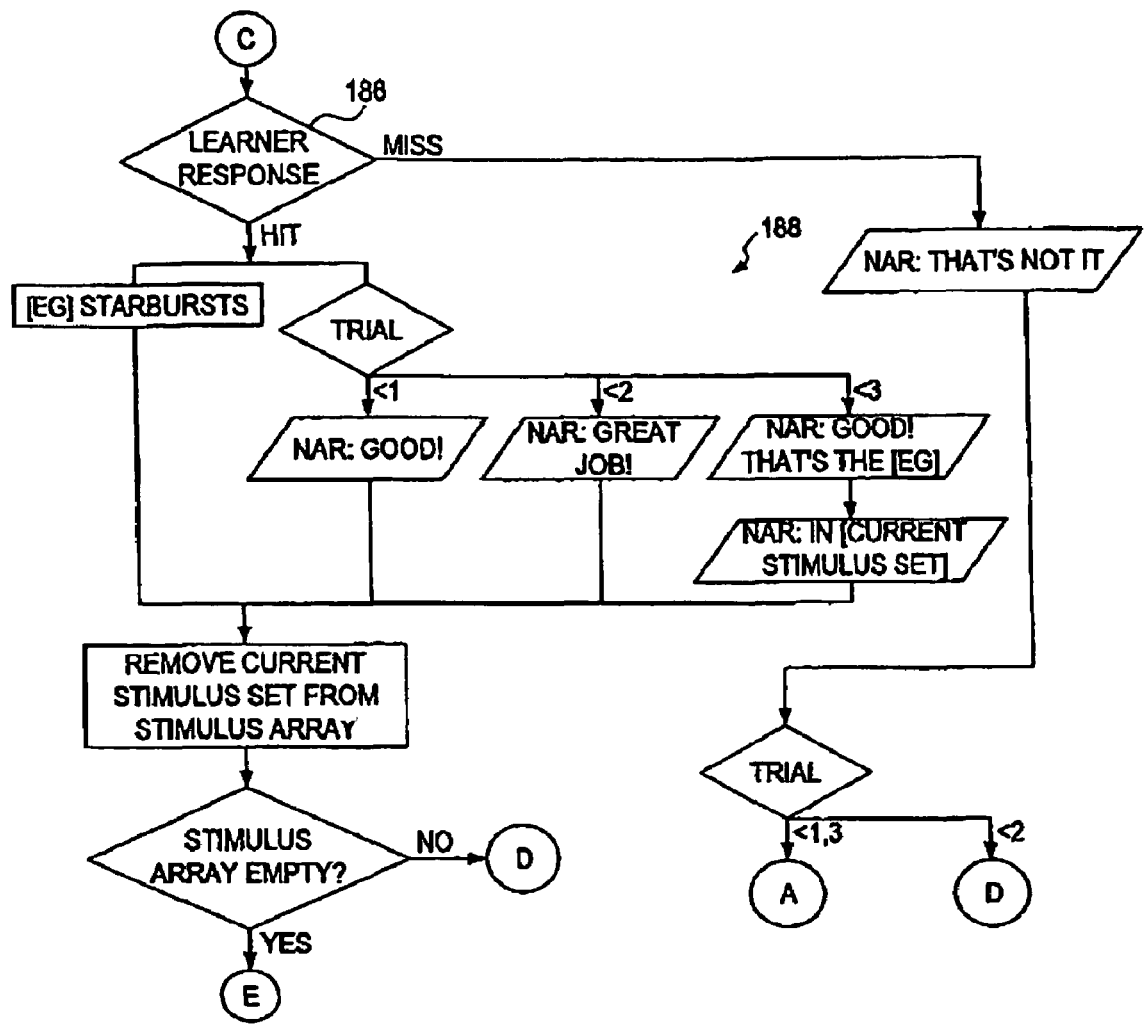
Figure 21:
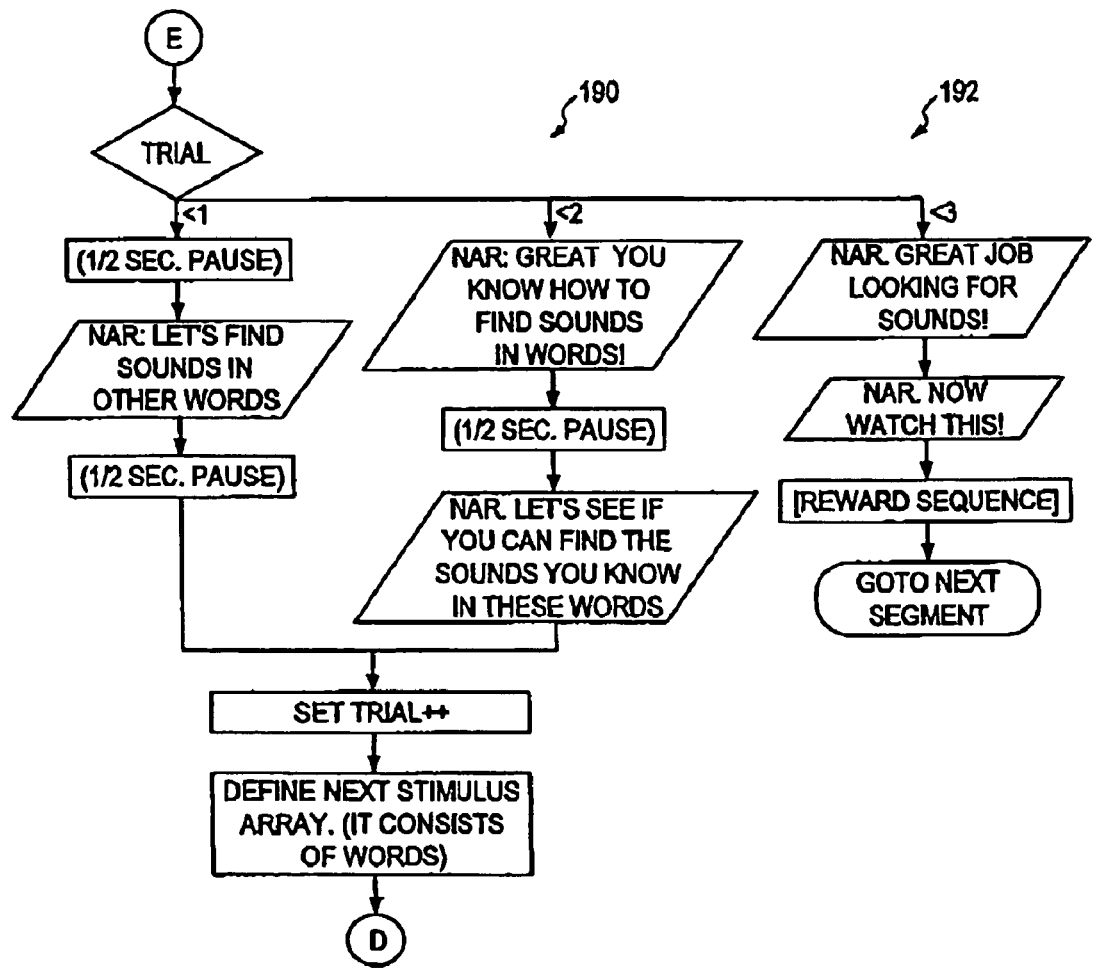

The user's response is evaluated at a decision block 186 in FIG. 20, and positive feedback is provided at blocks 188 if the user clicked correctly. In blocks 190 in FIG. 21, additional words are presented to the user. If the user has correctly clicked on more than a threshold number of words, then a reward sequence or other positive feedback is provided at blocks 192.

Figure 28:
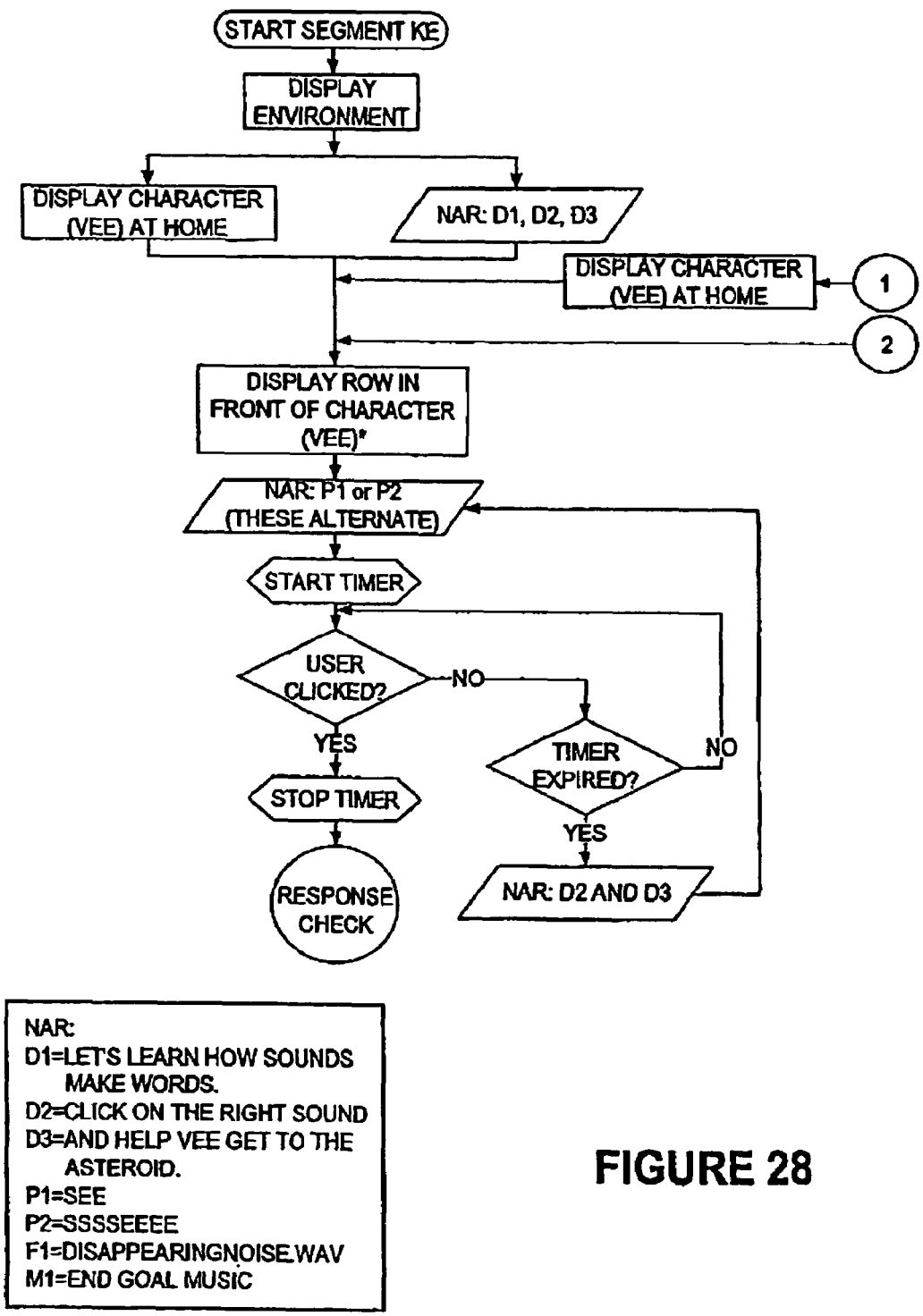
FIGS. 28–29 are flowcharts depicting an embodiment of a blending and segmenting routine for a teaching method that can be implemented using the system of FIG. 1.
Figure 29:
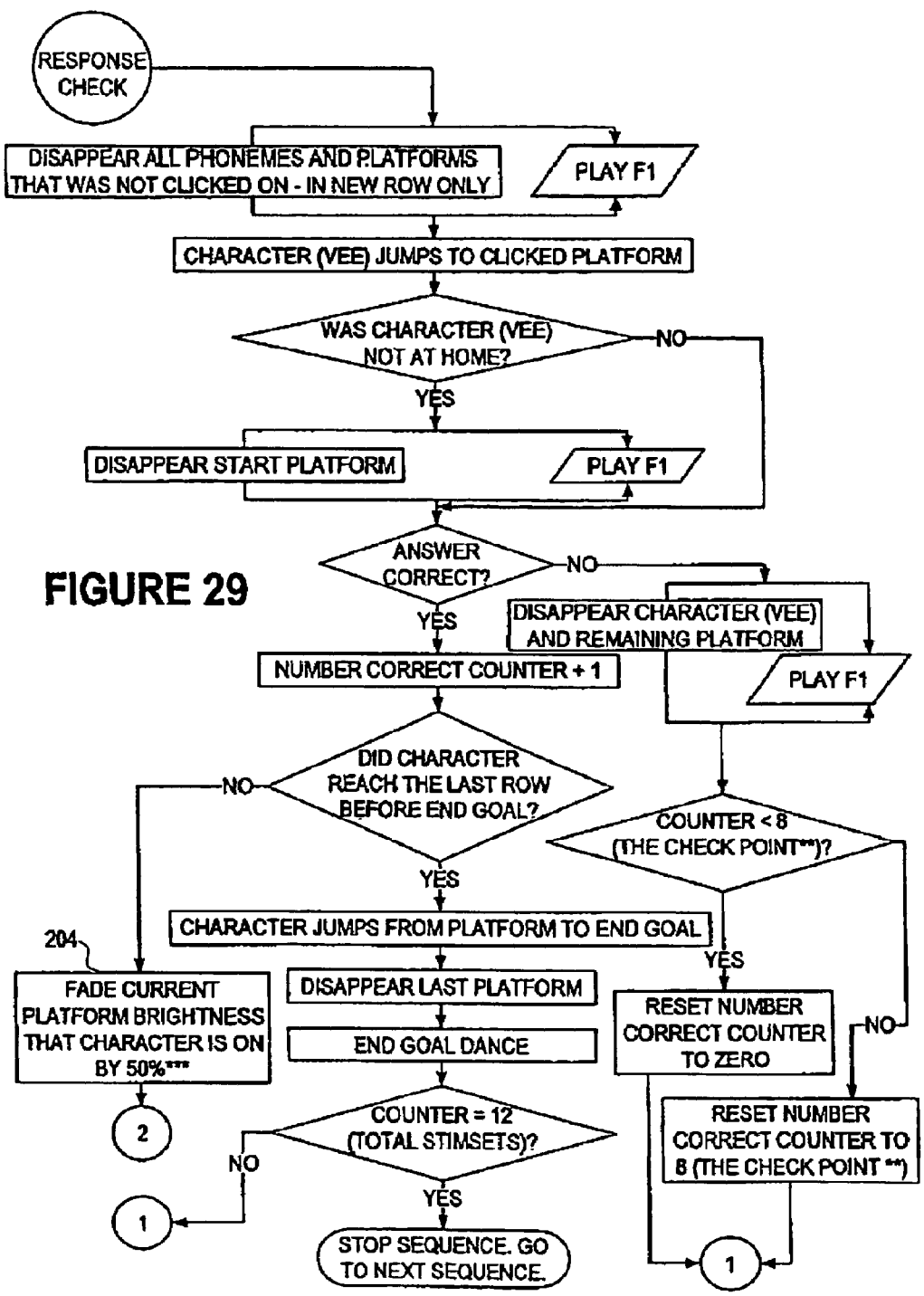

An embodiment of the Ke (and $F_2$, where the notation 2 can designate a different graphical embodiment of the F routine) routine involves discrimination and association, and is performed by clicking on a printed word upon hearing either a spoken word or an elongated (blended) spoken word. An embodiment of the blending and segmenting routine Ke is shown in FIGS. 28–29. In the embodiment of the routine Ke, the example printed word is first presented with other nonexample words that are displayed (or otherwise presented) at a different dimension or at a different dimension value (such as at a different intensity) than a dimension (or dimension value) of the example word. As the learner correctly clicks on the example words and proceeds through, the sequence, the nonexample word's dimension (or dimension value along the same dimension) is systematically changed until that dimension (or dimension value) is indistinguishable from the dimension (or dimension value) of the example words. In one embodiment, the intensity of the nonexample word(s) is changed (is increased for instance) until the intensity is indistinguishable from the intensity of the example word(s). In another embodiment, the higher/lower intensity changes may be implemented in the reverse. These various features are shown in FIGS. 28–29, and in a block 204 in particular, where intensity is changed after each correct click by the learner. As another illustration, a dimension, such as color of the nonexamples, may be changed as contrasted to a different dimension of the example, such as font.

Figure 33:
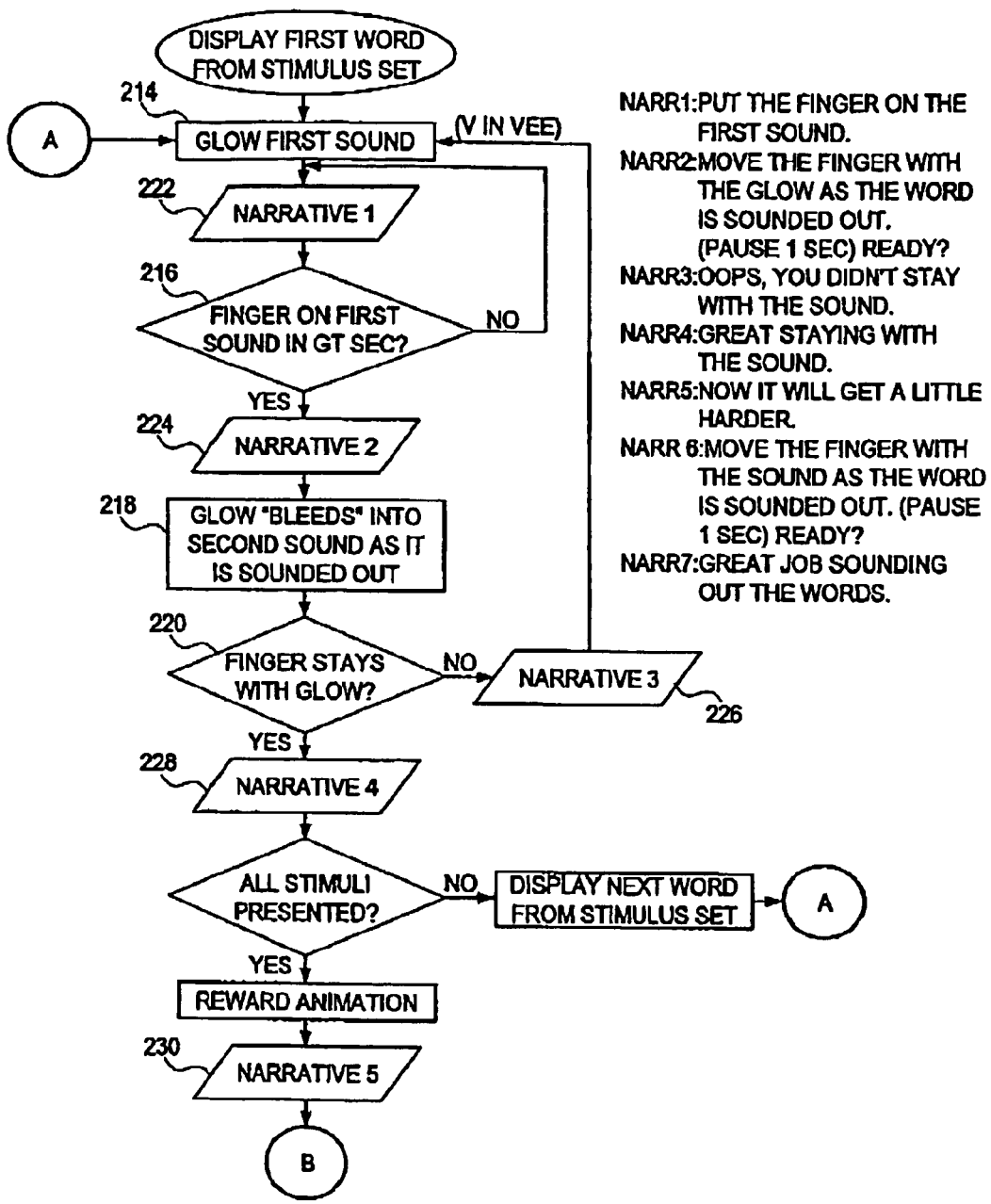
FIGS. 33–34 are flowcharts depicting an embodiment of a blending and segmenting routine for a teaching method that can be implemented using the system of FIG. 1.
Figure 34:
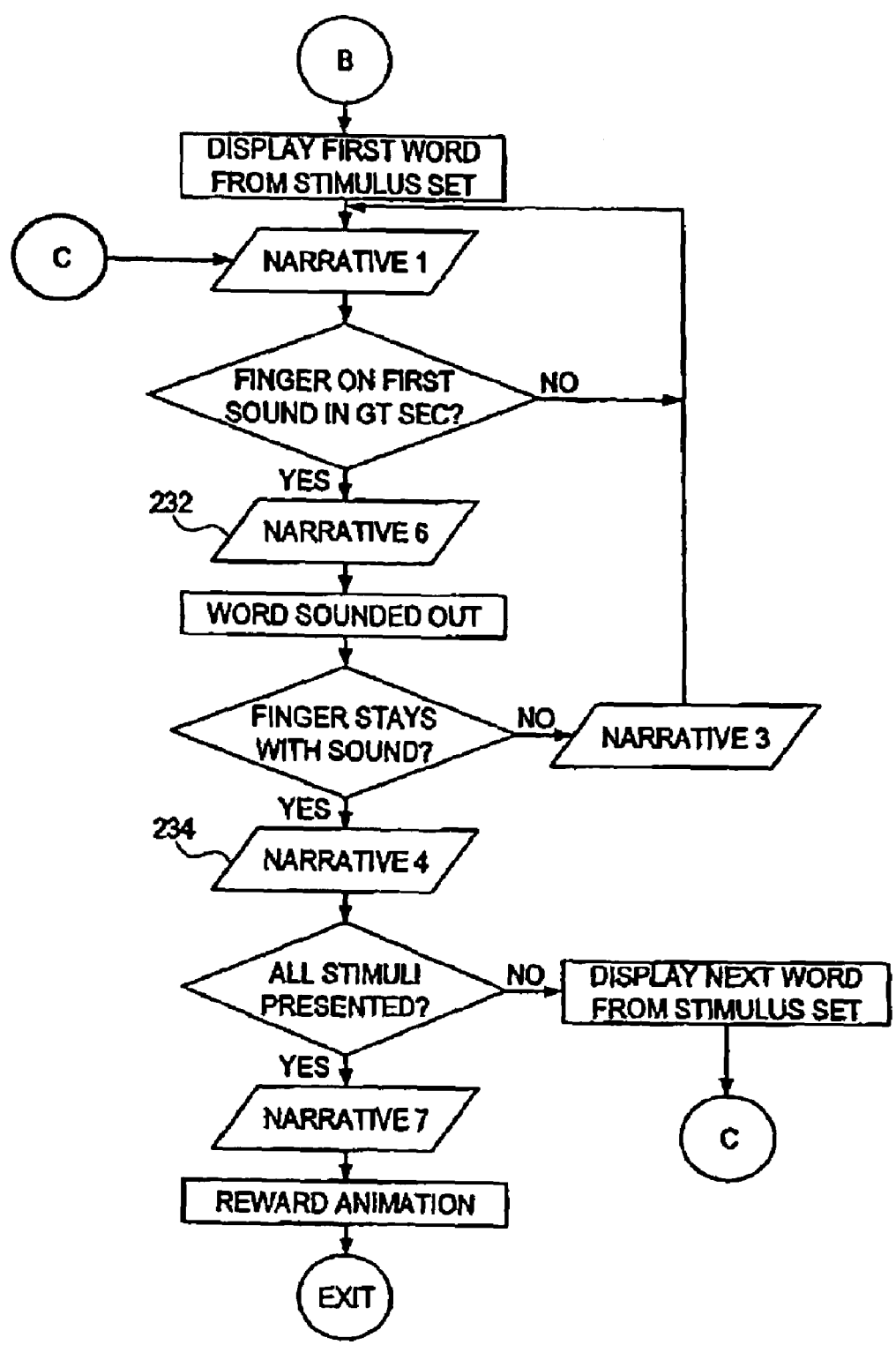

FIGS. 33–34 are flowcharts depicting an embodiment of a blending and segmenting routine Kf, such as in Part 2 of Episode 7, that can be implemented using the system of FIG. 1. The routine Kf uses audio and visual stimuli to teach the user to discriminate examples from nonexamples, and to identify new examples. At a block 214, a sound in a word (such as the "v" in "vee") is "glowed" or identified in some other manner, and a corresponding narration at a block 222 instructs/prompts the user to put a cursor, a finger displayed on the screen, or other visually displayable element on the glowed sound. If the user puts the cursor on the glowed sound at a decision block 216, then the narration subsequently prompts the user at a block 224 to move the cursor as the word is sounded out (e.g., the glow "bleeds" into a second sound as it is sounded out at a block 218). Blocks 220 and 226 determine whether the user followed the glow. Subsequent blocks 228, 230, 232, and 234 form parts of additional exercises where the level of complexity is increased. For instance, the user may be asked again to move the cursor as the words are sounded out, except without the aid of the glow. In accordance with an embodiment of the invention, the system 10 can determine whether the user followed the glow and/or sound correctly with the cursor (such as at decision blocks 216 or 220) by providing the cursor with "click and drag" functionality. In this manner, beginning, intermediate, and ending screen positions of the cursor can be detected and transmitted to the server 14 for processing in one embodiment, while another embodiment can process such positions locally at the terminal 16.

The remaining episodes build on skills developed in previous episodes, as they apply to activities such as identifying new components, putting these new components together into composites, putting composites together into sentences, etc., using the various skills/strategies identified by letters herein. For the sake of brevity, these remaining episodes are not described in further detail herein, except where new skills/strategies may be presented.

Figure 22:
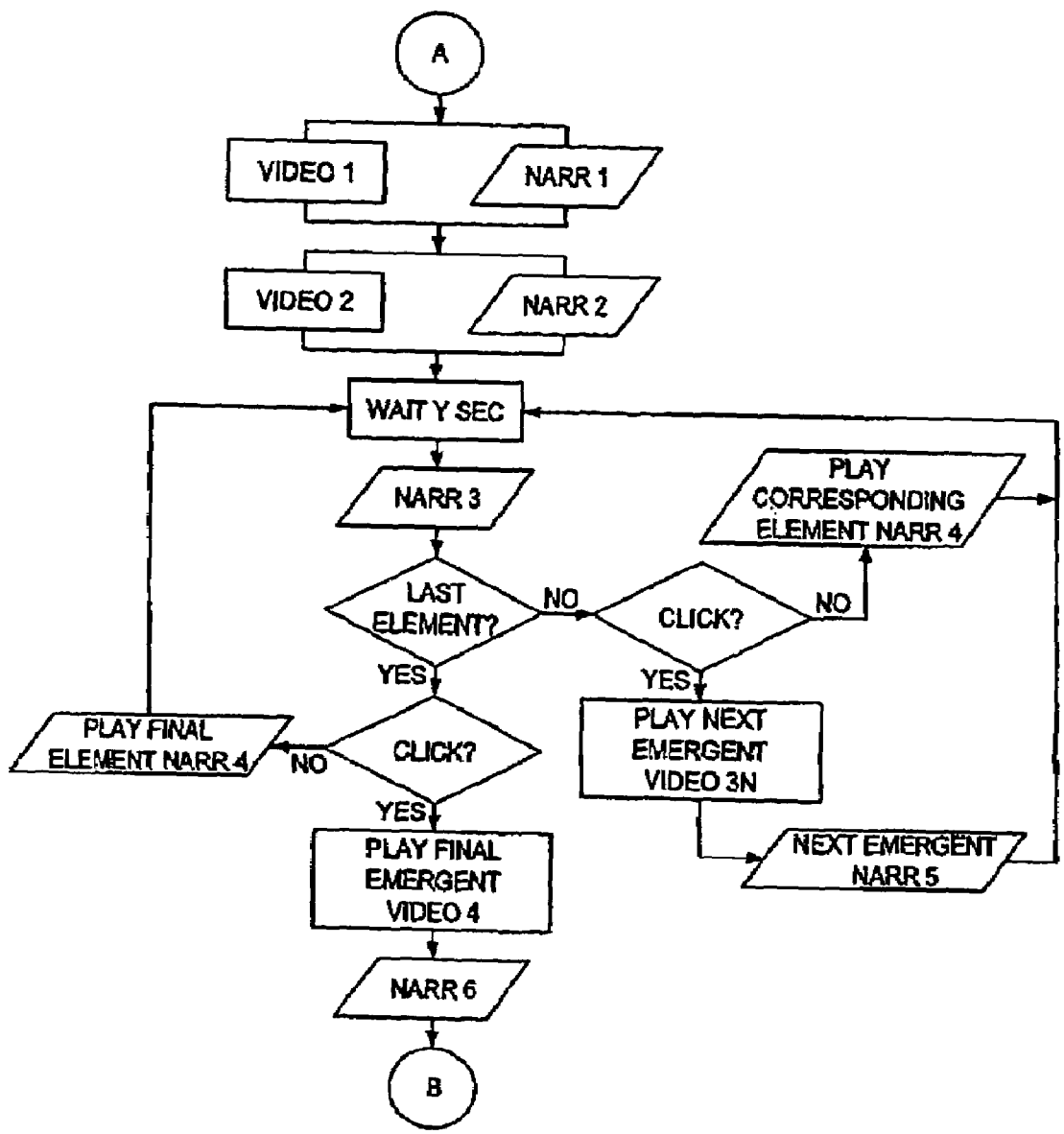
FIGS. 22–24 are flowcharts depicting an embodiment of a potentiating routine for a teaching method that can be implemented using the system of FIG. 1.
Figure 23:
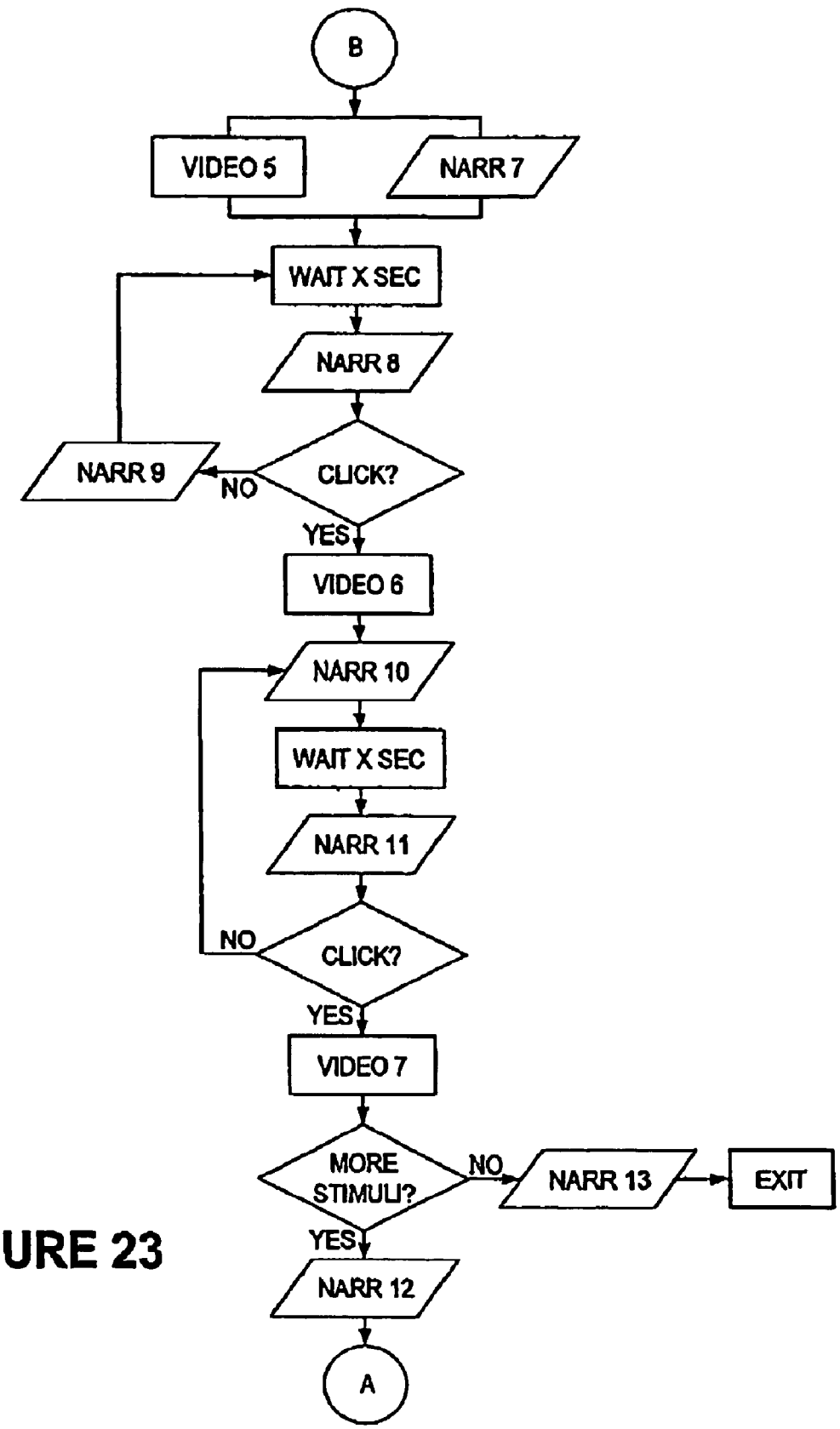
Figure 24:
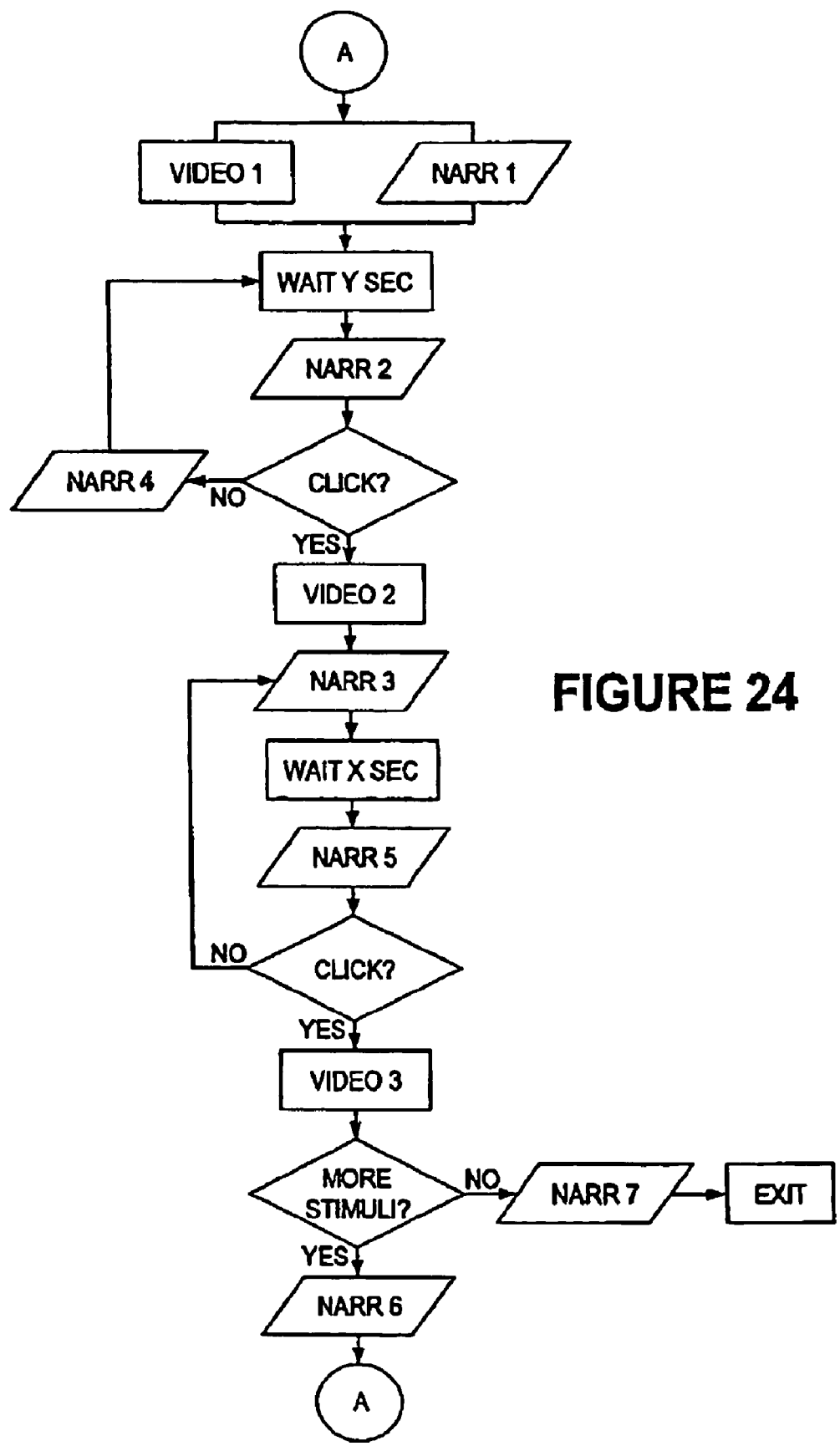

For instance, FIGS. 22–24 are flowcharts depicting an embodiment of a potentiating routine. Such a potentiating routine can be used in Part 3 of Episode 6 (labeled H) or for Part 8 of Episode 7 (labeled Hw). An embodiment of the potentiating routine involves echoic discrimination and comprises designed sequences to encourage leaner-spoken behavior in the absence of a human listener or voice recognition capabilities. An embodiment of the potentiating routine can be, in another embodiment, designed to interface with voice recognition systems if desired. One embodiment of the potentiating routine has uniquely designed presentation, confirmation, and correction subroutines. The learner says sounds or words; clicks on letters, words, or other objects representing correctly and incorrectly spoken sounds and words, and says the sounds again louder, or says a word blended and then quickly as a sight word. Confirmations and corrections can be similar to those describe above. Confirmations can include, for instance, verbal praise and a change in the visual stimulus. Audio corrections may also be included. These elements are illustrated in the various blocks of FIGS. 22–24.

Figure 25:
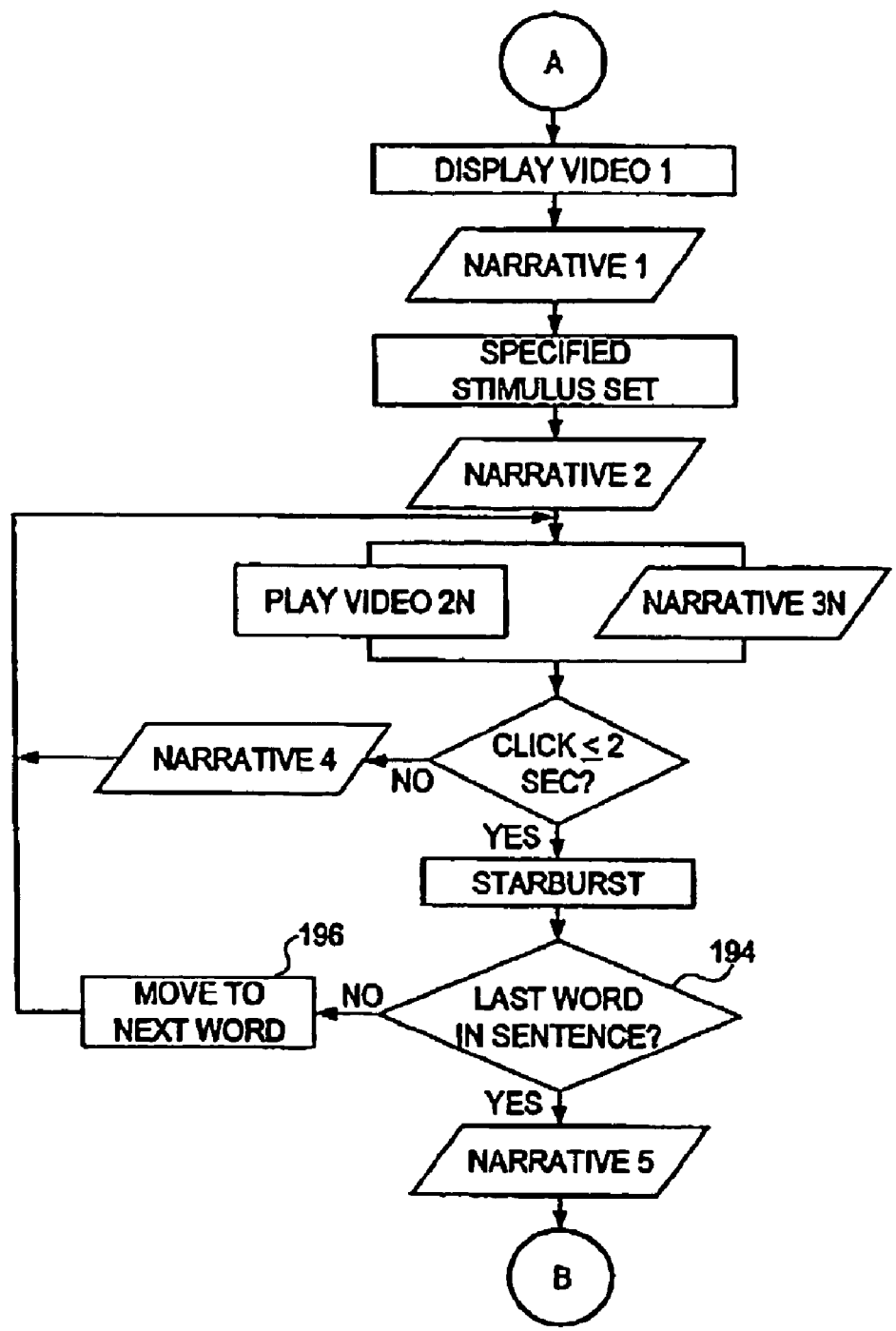
FIGS. 25–27 are flowcharts depicting an embodiment of a sentence reading routine for a teaching method that can be implemented using the system of FIG. 1.
Figure 26:
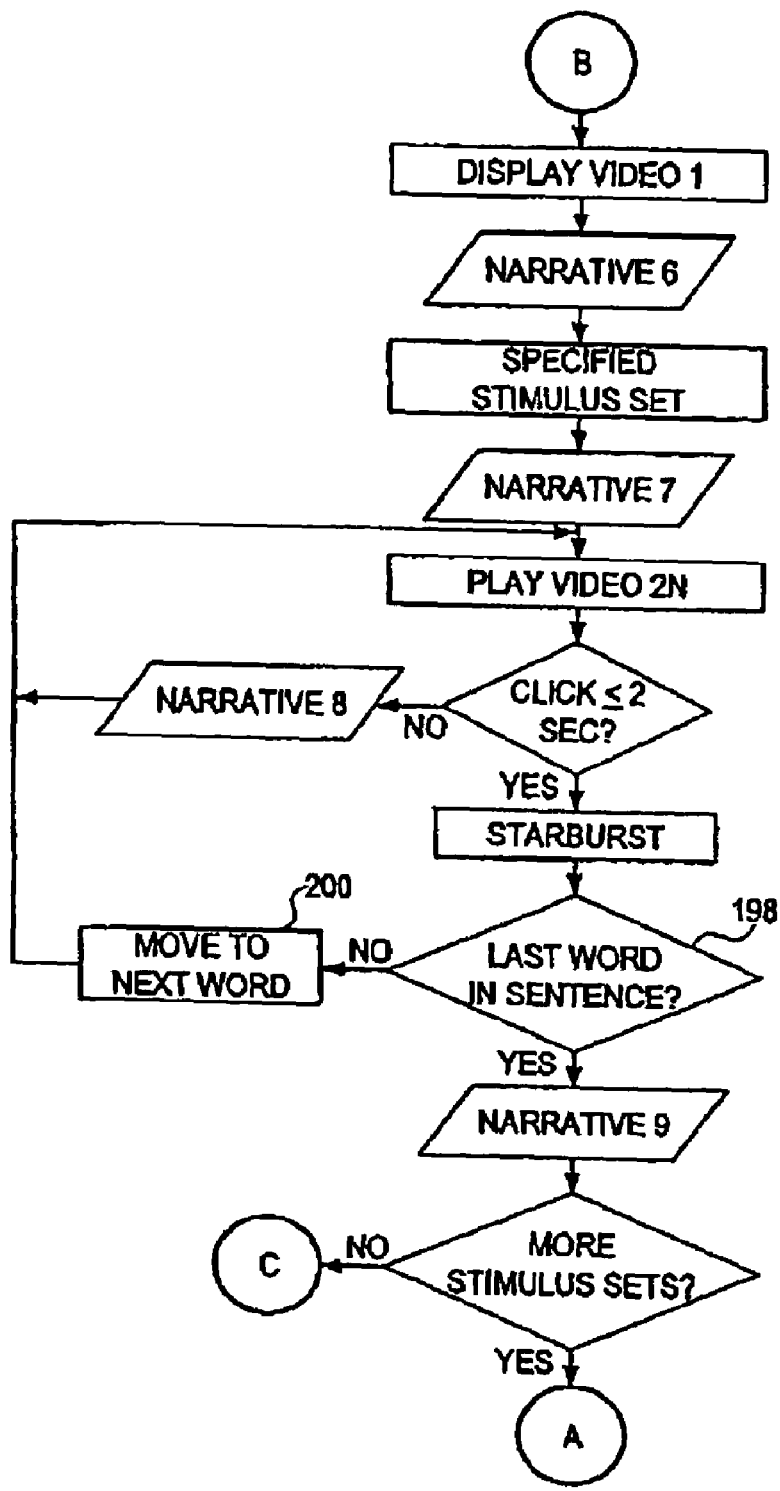
Figure 27:
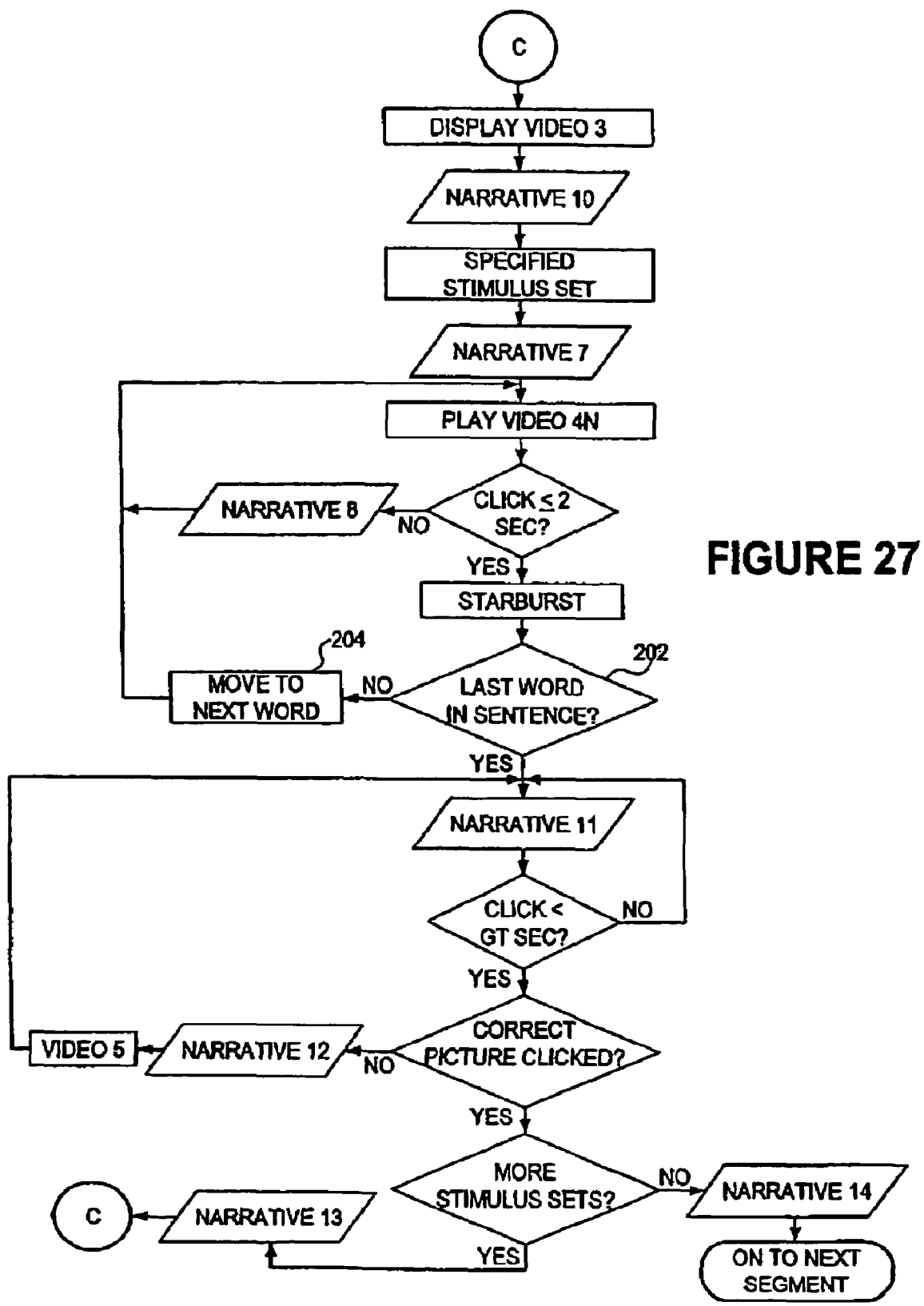

FIGS. 25–27 are flowcharts depicting an embodiment of a sentence/story-reading routine (a type of "sequential composite routine" that teaches serial order and context interpretation), such as the sentence reading routine labeled W in Part 4 of Episode 10 for an embodiment of the invention implemented to teach reading, which involves recognition, sequence following, vocal productions, and thematic matching, in one embodiment. Learners learn word order and sentence sense by first hearing and clicking the words as a narrator reads them, then the learner reads the words as highlighted by the software. Finally, the learner reads the sentence and clicks on a picture indicating what the sentence was about. Stories are then introduced where the procedures described for sentence reading are applied to multiple sentences linked by a common theme. Both sentence sense indicators (e.g., pictures) and story indicators may be used for these exercises. These various aspects are illustrated in FIGS. 25–27.

In the embodiment of the sentence reading routine W shown in FIGS. 25–27, the exercises that are presented to the user are in the form of words and sentences. The words are sequentially presented to the learner (and the learner clicks on the words as they are narrated), until the last word of each sentence is reached. This is depicted in blocks 194–204 in FIGS. 25–27. In another embodiment, the routine W can be in the form of arrays and stimuli presented to the learner, instead of or in addition to words and sentences. In such an embodiment, the blocks 194–24 in FIGS. 25–27 can demarcate progression from one stimulus to another until the last stimulus in an array is reached.

Figure 30:
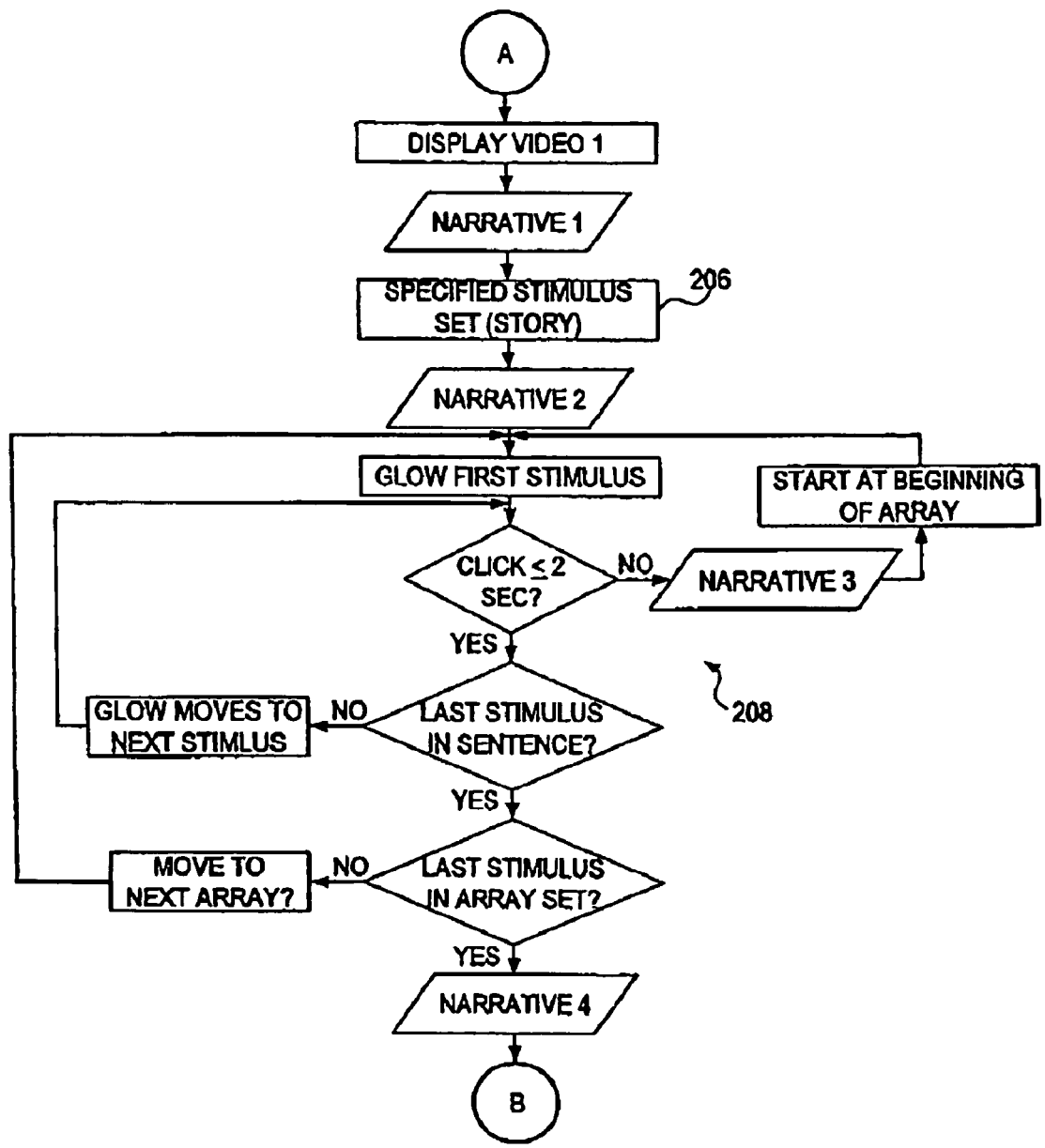
FIGS. 30–32 are flowcharts depicting an embodiment of a story reading routine for a teaching method that can be implemented using the system of FIG. 1.
Figure 31:
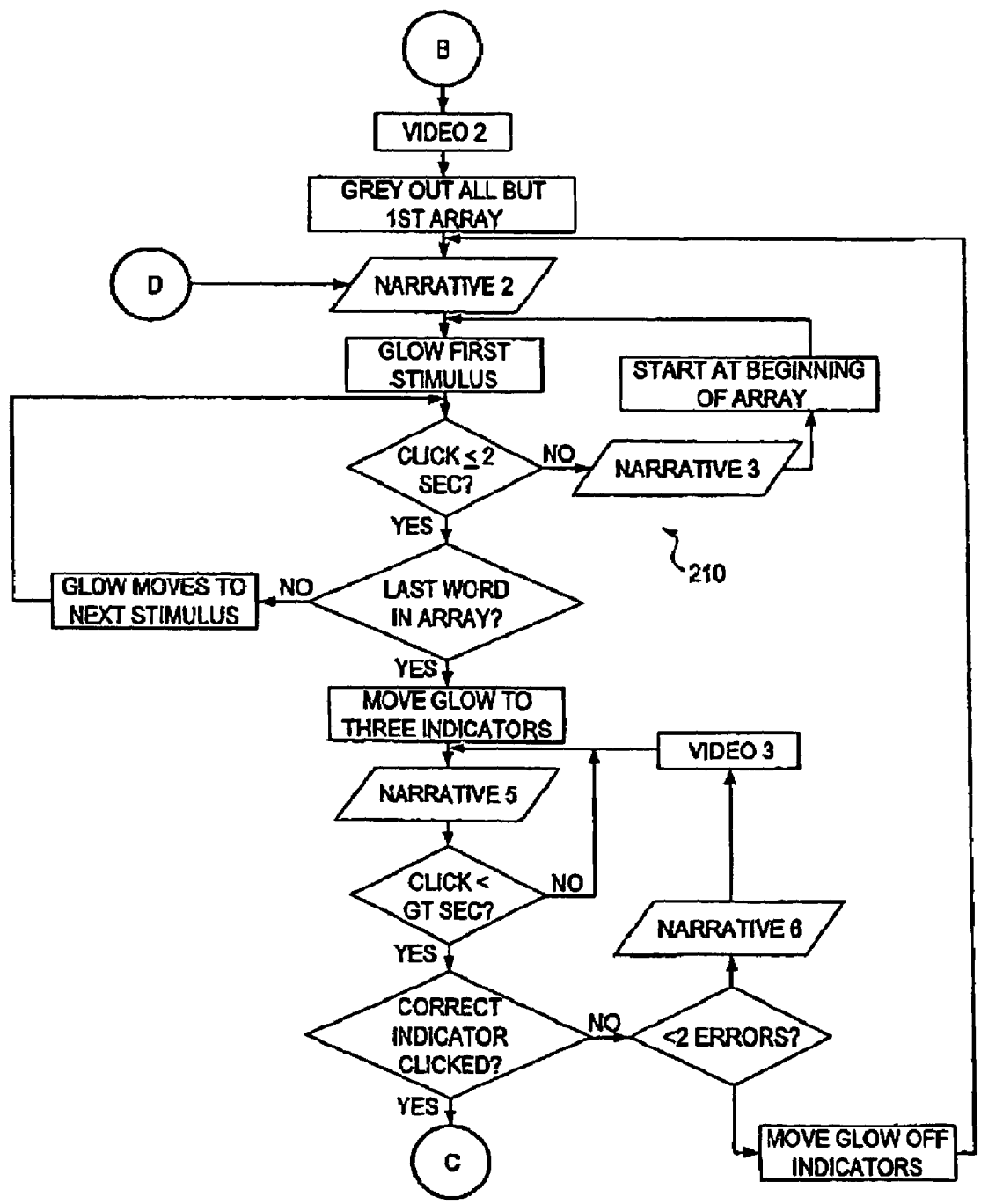
Figure 32:
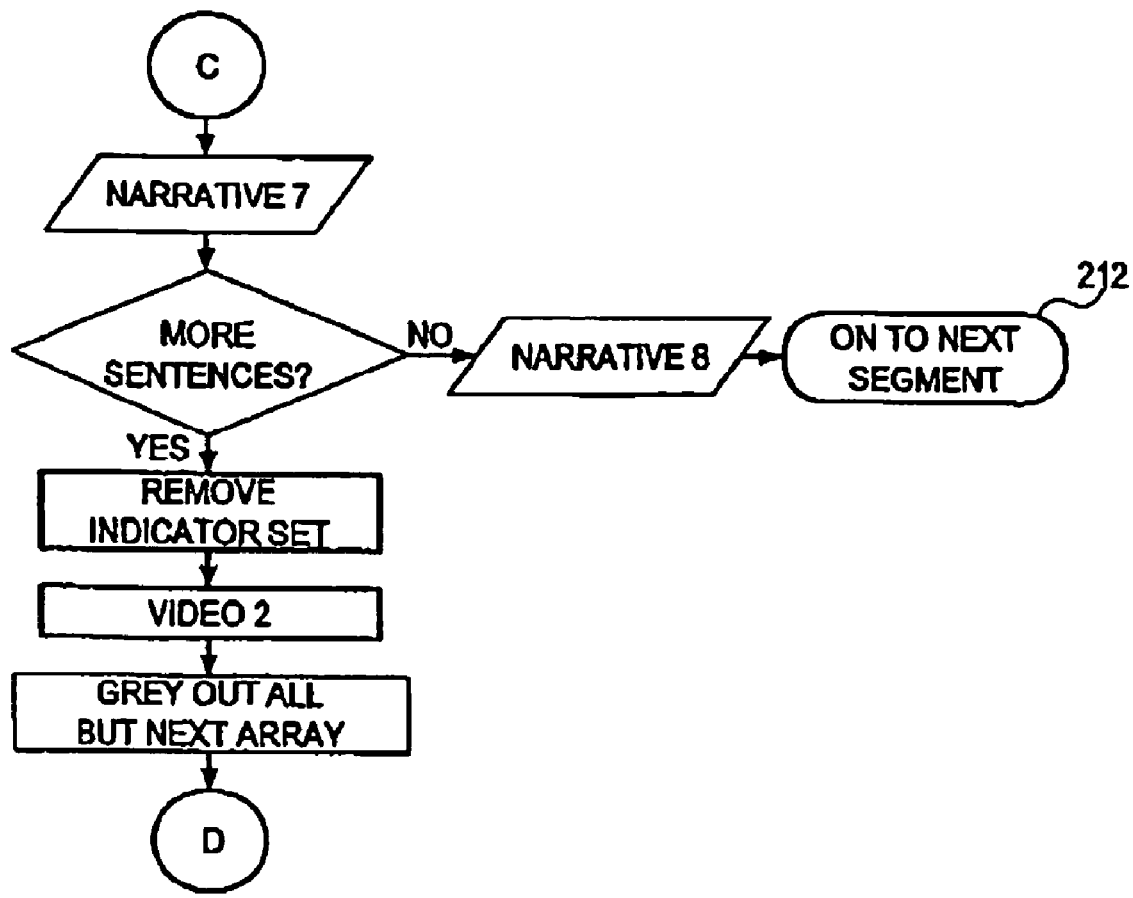

FIGS. 30–32 are flowcharts depicting an embodiment of a story reading routine, such as the story reading routine Q of Part 5 of Episode 10. At a block 206 in FIG. 30, a stimulus set in the form of sentences that together make up a story is presented to the learner. Groups of sentences in a story may be in an array. Next at blocks 208, the sentences are narrated word for word, and the learner follows along by clicking on (and, speaking) the words as they are said. The learner may also be presented with pictures to click. Additional arrays of sentences/pictures can be presented (and clicked) at blocks 210 of FIG. 31, to continue the story-reading exercise, until the exercise is completed at a block 212 and the next segment can begin.

An embodiment of the invention can also include application routines, which may be built from or separate from the sentence/story-reading routines. The application routines can be implemented in an embodiment that includes graphic-intensive activities to allow learners to demonstrate their reading skills in real-world or structured contexts, such as interacting with cartoon characters, reading stories in duets with a parent/guardian, and playing mystery or travel games. An embodiment of the application routines can also include reading new words and sentences previously untaught, and selecting pictures that illustrate the meaning of the word or sentence.

The various routines described herein can include or work in conjunction with one or more motivation routines. Embodiments of the motivation routines involve the provision of rewarding scenarios and/or activities, immediately following learner performance that meets pre-specified criteria. An embodiment of the motivation routine defines the contexts in which the previously described routines can be embedded and applied. For example, establishing and fluency routines can occur in cartoon episodes. Criterion performance can result in opportunities to engage in reward environments, such as building fish and sunken ships from given fish and ship parts. Reading certain passages may result in voicemail or email to a grandmother or other important person. An embodiment of the motivation routine can be based on the fact that learners are often prompted to read words and passages to others, and that fluency practice often occurs while playing games.

According to an embodiment of the invention, a database of user performance can be maintained and used to determine user interactions within segments, between segments, and between episodes. For example, consecutive errors (or other pattern of errors or an instance of error) within a segment may result in a different correction subroutine, such as in the establishing routine F. As another example, segments where exit criteria (to move from one exercise to another) have been met, but that took many corrections to do so, might be branched into another similar segment rather than moving to a new segment. As yet another example, segments where criteria were not met may be included in additional segments attached to later episodes such as in Episode 6 (non fluent elements G). This data of user performance may be stored in the database unit 32 and/or it may be stored locally, such as in the storage unit 26 of the terminal 16.

As is illustrated in the episode sequence above, routines are or can be reused through various iterations of the specific sequencing (e.g., establishing, with new stimuli), thereby creating new episodes. Episode sequences repeat as a cumulative repertoire is produced. Routines may vary in their exact sequencing as can the sequence of episodes based upon the particular instructional objective and on the current repertoire of the individual learner.

For the sake of illustration, a description of the various tasks related to the skills/strategies identified by letters for the episode sequence are provided below:

A. Estab pairings of auditory and visual presentations of stimulus or action to be learned.

B. Estab Make observing response to stimulus or action to be learned.

C. Estab Presented with example that then morphs into nonexample of stimulus or action to be learned. Can respond correctly to next stimulus [examples ("egs") or nonexamples ("negs")]. Vary eg or neg in semi-random fashion.

Pre-D. Estab Pick only eg of stimulus/action.

D. Estab Select examples of stimulus/action from eg/neg arrays. Introduction to E and F.

E. Adduc Select new stimulus or action from within larger, established stimulus or action (responding via exclusion).

F. Estab Select examples of stimulus/action from eg/neg arrays. Task requirement can change with each presentation. Arrays contain correct stimulus/action with negs that are egs on other trials.

G. Fluency Free Operant Fluency: select all of a stimulus/action from among eg/neg arrays, within specified timing period.

H. Estab Prime vocal responses to stimulus/action. Echoic behavior.

L. Fluency Trial Fluency can respond correctly to each stimulus/action from eg/neg arrays within specified timing period.

I. Adduc Select new stimulus/action from among recombinations of established stimuli/actions. Iterative target elements are intermixed within an array.

J. Fluency: Segmenting.
   Select certain stimulus/action within composite stimulus/action. Select specific stimulus/action from among eg/neg arrays.

K. Estab: Composite repertoire: cumulative sequence of steps in performing a skill.
   Example from reading: Teaching learner to sound out a word:

Ka Estab: Sounding word out slowly, with no space between elements.

Kavw Estab: Cumulative of audio, visual and saying word fast.

Ks Estab: Pronouncing sounds (elements) correctly.

Kavws Estab: Cumulative of audio, visual, word, and sound.

Ke. Estab: Blending. Equivalence procedure.

Mt. Adduction Fluency

M. Adduction Fluency

P. Estab: Finding stimulus/action within composite

T. Fluency: Select stimulus/action that contains a given string of segmented stimuli/actions. Select specific stimulus/action from among eg/neg arrays, within a specified timing period.

U. Application (Ultimate Outcome):
   Example from beginning reading: Given a new word, the learner will fluently segment, blend, and say the new word/choose the corresponding picture.

N. Estab: discriminating correct from incorrect composites:
   Example from beginning reading:
   Lee sees the can:
   a). Lee sees the big can,
   b). Lee sees can.
   c). Lee sees the man.
   d). Lee sees can the.

W. Estab Building sequential composite repertoires: Selecting correct order of stimuli or steps in action or sequence of stimuli.

Example from beginning reading: Sentence Sense
Glow moves from word to word as learner clicks, then says words. Following glow again, then selects pictures/Click correct picture of sentence from three pictures Q. Estab Story Reading Episode Nomenclature:
a audio
c comprehension
d decoding
e establishing sequence
p prompted or modeled
r review (cumulative)
s sound
t terminal
v visual
w word In conclusion, an embodiment of the invention provides procedures to teach certain skills to learners without a teacher present. In accordance with one embodiment of the invention, the various procedures/routines can be provided or implemented via a computer network, such as the Internet, so that multiple learners can access and use the procedures. Additionally, embodiments of the invention include certain feedback features (such as the presentation of various stimuli, followed by presentation of auditory or visual confirmation whether certain exercises were performed correctly, accompanied by features that track the learner's progress) that take into account that the Internet is a medium where it is difficult, if not impossible, to directly monitor the learner's activities during the course of the various lessons. The routines may be implemented in a sequence of episodes, with each episode systematically building on the particular skills learned in a prior episode. Some of these routines that are generic to any repertoire to be taught include, but are not limited to, establishing routines, adduction routines, fluency routines, motivation routines, application routines, and the overall sequencing of these routines. Routines that can be specific to the reading instruction example described herein include potentiating routines, blending and segmenting routines, and sentence and story routines. Application to other areas, such as math and reasoning, can include other, content-specific routines such as those illustrated for reading.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, the teaching of reading skills has been described herein for illustrative purposes. It is to be appreciated that principles of an embodiment of the invention can be use to teach other skills and/or subject matters. These include mathematics, geography, non-English languages, science, reasoning and problem solving, or other skills and subject matters. In such situations, the various algorithms, stimuli, etc. can be modified as needed to be in conformance with the particular routine or subject matter being taught.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computer-implemented system for teaching a user, comprising:
an establishing module configured to teach the user identification of a component and discrimination of that component from other components, comprising a prompt to discriminate between absence and presence of an auditory representation of the component;
an adduction module configured to combine previously-learned components into new component sets, substantially without teaching the user these new component sets independently; and
a fluency module configured to provide practice exercises to the user in order to aid the user in retaining and applying what he has learned.

2. A computer-implemented system for teaching a user, comprising:
an establishing module configured to teach the user identification of a component and discrimination of that component from other components, comprising a prompt to discriminate between an auditory representation of the component and an auditory representation of a juxtaposition of similar components;
an adduction module configured to combine previously-learned components into new component sets, substantially without teaching the user these new component sets independently; and
a fluency module configured to provide practice exercises to the user in order to aid the user in retaining and applying what he has learned.

3. A computer-implemented system for teaching a user, comprising:
an establishing module configured to teach the user identification of a component and discrimination of that component from other components, comprising a prompt to identify presence of an auditory representation of a different components;
an adduction module configured to combine previously-learned components into new component sets, substantially without teaching the user these new component sets independently; and
a fluency module configured to provide practice exercises to the user in order to aid the user in retaining and applying what he has learned.

4. A computer-implemented system for teaching a user, comprising:
an establishing module configured to teach the user identification of a component and discrimination of that component from other components, comprising:
a prompt to pair a visual representation of the component with an auditory representation of the component;
a prompt to discriminate between absence and presence of the auditory representation of the component;
a prompt to discriminate between the auditory representation of the component and an auditory representation of a juxtaposition of similar components; and
a prompt to identify presence of an auditory representation of a different component; and
an adduction module configured to combine previously-learned components into new component sets, substantially without teaching the user these new component sets independently; and a fluency module configured to provide practice exercises to the user in order to aid the user in retaining and applying what he has learned.

5. A computer-implemented system for teaching a user, comprising:
- an establishing module configured to teach the user identification of a component and discrimination of that component from other components, comprising a prompt to discriminate between absence and presence of an auditory representation of the components;
- a composite module configured to teach the user identification of a component and discrimination of that component from other components and from their combinations; and
- a fluency module configured to provide practice exercises to the user in order to aid the user in retaining and applying what he has learned.

6. A computer-implemented system for teaching a user, comprising:
- an establishing module configured to teach the user identification of a component and discrimination of that component from other components, comprising a prompt to discriminate between an auditory representation of the component and an auditory representation of a juxtaposition of similar components;
- a composite module configured to teach the user identification of a component and discrimination of that component from other components and from their combinations; and
- a fluency module configured to provide practice exercises to the user in order to aid the user in retaining and applying what he has learned.

7. A computer-implemented system for teaching a user, comprising:
- an establishing module configured to teach the user identification of a component and discrimination of that component from other components, comprising a prompt to identify presence of an auditory representation of a different components;
- a composite module configured to teach the user identification of a component and discrimination of that component from other components and from their combinations; and
- a fluency module configured to provide practice exercises to the user in order to aid the user in retaining and applying what he has learned.

8. A computer-implemented system for teaching a user, comprising:
- an establishing module configured to teach the user identification of a component and discrimination of that component from other components, comprising:
  - a prompt to pair a visual representation of the component with an auditory representation of the component;
  - a prompt to discriminate between absence and presence of the auditory representation of the component;
  - a prompt to discriminate between the auditory representation of the component and an auditory representation of a juxtaposition of similar components; and
  - a prompt to identify presence of an auditory representation of a different component; and
- a composite module configured to teach the user identification of a component and discrimination of that component from other components and from their combinations; and
- a fluency module configured to provide practice exercises to the user in order to aid the user in retaining and applying what he has learned.

9. A computer-implemented system for teaching a user, comprising:
- an establishing module configured to teach the user identification of a component and discrimination of that component from other components;
- a composite module configured to teach the user identification of a component and discrimination of that component from other components and from their combinations, comprising a prompt to join a first learned component with a second learned component and to speak a sound representative of the joined components; and
- a fluency module configured to provide practice exercises to the user in order to aid the user in retaining and applying what he has learned.

10. A computer-implemented system for teaching a user, comprising:
- an establishing module configured to teach the user identification of a component and discrimination of that component from other components;
- a composite module configured to teach the user identification of a component and discrimination of that component from other components and from their combinations, comprising a prompt to separate joined components into a first learned component and a second learned component; and
- a fluency module configured to provide practice exercises to the user in order to aid the user in retaining and applying what he has learned.

11. A computer-implemented system for teaching a user, comprising:
- an establishing module configured to teach the user identification of a component and discrimination of that component from other components;
- a composite module configured to teach the user identification of a component and discrimination of that component from other components and from their combinations, comprising:
  - a prompt to identify a first learned component;
  - a prompt to identify a second learned component;
  - a prompt to join the first learned component with the second learned component and to speak a sound representative of the joined components;
  - a prompt to identify the first learned component and the second learned component in the joined component; and
  - a prompt to separate the first learned component from the second learned component; and
- a fluency module configured to provide practice exercises to the user in order to aid the user in retaining and applying what he has learned.

12. A computer-implemented system for teaching a user, comprising:
- an adduction module configured to combine previously-learned components into new component sets, substantially without teaching the user these new component sets independently;
- a composite module configured to teach the user identification of a component and discrimination of that component from other components and from their combinations, comprising a prompt to join a first learned component with a second learned component and to speak a sound representative of the joined components; and a fluency module configured to provide practice exercises to the user in order to aid the user in retaining and applying what he has learned.

13. A computer-implemented system for teaching a user, comprising:
- an adduction module configured to combine previously-learned components into new component sets, substantially without teaching the user these new component sets independently;
- a composite module configured to teach the user identification of a component and discrimination of that component from other components and from their combinations, comprising a prompt to separate joined components into a first learned component and a second learned component; and
- a fluency module configured to provide practice exercises to the user in order to aid the user in retaining and applying what he has learned.

14. A computer-implemented system for teaching a user, comprising:
- an adduction module configured to combine previously-learned components into new component sets, substantially without teaching the user these new component sets independently;
- a composite module configured to teach the user identification of a component and discrimination of that component from other components and from their combinations, comprising:
  - a prompt to identify a first learned component;
  - a prompt to identify a second learned component;
  - a prompt to join the first learned component with the second learned component and to speak a sound representative of the joined components;
  - a prompt to identify the first learned component and the second learned component in the joined component; and
  - a prompt to separate the first learned component from the second learned component; and
- a fluency module configured to provide practice exercises to the user in order to aid the user in retaining and applying what he has learned.

\* \* \* \* \*